(12) United States Patent
Vasanadu et al.

(10) Patent No.: US 12,188,792 B2
(45) Date of Patent: Jan. 7, 2025

(54) PARK LOCK ASSEMBLY

(71) Applicants: Ningbo Geely Automobile Research & Development Co., Ltd., Ningbo (CN); Zhejiang Geely Holding Group Co., Ltd., Zhejiang (CN)

(72) Inventors: Sharan Vasanadu, Gothenburg (SE); Johan Ekelund, Gothenburg (SE)

(73) Assignees: Zhejiang Geely Holding Group Co., Ltd., Zhejiang (CN); Ningbo Geely Automobile Research & Development Co., Ltd., Ningbo (CN)

( * ) Notice: Subject to any disclaimer, the term of this patent is extended or adjusted under 35 U.S.C. 154(b) by 0 days.

(21) Appl. No.: 17/984,988

(22) Filed: Nov. 10, 2022

(65) Prior Publication Data

US 2023/0074092 A1    Mar. 9, 2023

Related U.S. Application Data

(63) Continuation of application No. PCT/CN2021/096798, filed on May 28, 2021.

(30) Foreign Application Priority Data

Jun. 4, 2020   (EP) ..................................... 20178331

(51) Int. Cl.
*G01D 5/20*         (2006.01)
*F16H 59/68*        (2006.01)
(Continued)

(52) U.S. Cl.
CPC ........... *G01D 5/2053* (2013.01); *F16H 59/68* (2013.01); *F16H 63/3416* (2013.01);
(Continued)

(58) Field of Classification Search
CPC .......... F16H 63/34–486; F16H 63/3416–3491; G01D 5/204
See application file for complete search history.

(56) References Cited

U.S. PATENT DOCUMENTS 4,700,797 A   10/1987 Leiber
5,807,205 A    9/1998 Odaka
(Continued)

FOREIGN PATENT DOCUMENTS

CN   206723433 U    12/2017
CN   111396551 A  *  7/2020
(Continued)

OTHER PUBLICATIONS

International Search Report from International Application No. PCT/CN2021/096798, mailed Sep. 1, 2021, 2 pages.

*Primary Examiner* — Stacey A Fluhart
*Assistant Examiner* — Lillian T Nguyen
(74) *Attorney, Agent, or Firm* — Tucker Ellis LLP

(57) ABSTRACT

A park lock assembly for a vehicle transmission includes a toothed park lock gear and a moveable locking pawl that is moveable between an engaged state, in which the locking pawl is in locking engagement with the park lock gear, and a disengaged state, in which the park lock gear is freely rotatable relative to the locking pawl. The park lock assembly also includes an inductive angular position sensor located on an axial side of the park lock gear and configured for detecting angular position of the park lock gear.

17 Claims, 12 Drawing Sheets

(51) Int. Cl.
*F16H 63/34* (2006.01)
*F16H 63/48* (2006.01)
*G01D 5/245* (2006.01)

(52) U.S. Cl.
CPC ......... *F16H 63/3458* (2013.01); *F16H 63/48* (2013.01); *G01D 5/2451* (2013.01)

(56) References Cited

U.S. PATENT DOCUMENTS

| | | | |
|---|---|---|---|
| 6,236,199 B1 * | 5/2001 | Irle | G01D 5/2093 |
| | | | 324/207.17 |
| 8,297,116 B2 | 10/2012 | Sun | |
| 2002/0088684 A1 | 7/2002 | Hoess | |
| 2005/0225320 A1 | 10/2005 | Lee | |
| 2012/0115665 A1 * | 5/2012 | Schwekutsch | F16H 63/3466 |
| | | | 475/150 |
| 2018/0073584 A1 * | 3/2018 | Tsukamoto | F16D 63/006 |
| 2018/0224301 A1 | 8/2018 | Herrmann | |
| 2019/0049002 A1 | 2/2019 | Wang | |
| 2019/0049005 A1 | 2/2019 | Clark | |

FOREIGN PATENT DOCUMENTS

| | | |
|---|---|---|
| DE | 102013014746 A1 | 3/2015 |
| DE | 102017101780 A1 | 8/2018 |
| DE | 102017121007 A1 | 3/2019 |
| DE | 102017123076 A1 | 4/2019 |
| DE | 102018109465 A1 | 10/2019 |
| HU | 190272 B * | 8/1986 |
| JP | 2018001895 A | 1/2018 |
| JP | 2020001575 A | 1/2020 |
| WO | WO-2022128723 A1 * | 6/2022 ............. G01D 5/204 |

\* cited by examiner

PARK LOCK ASSEMBLY

RELATED APPLICATION DATA

This application is a continuation of International Patent Application No. PCT/CN2021/096798, filed May 28, 2021, which claims the benefit of European Patent Application No. 20178331.3, filed Jun. 4, 2020, the disclosures of which are incorporated herein by reference in their entireties.

TECHNICAL FIELD

The present disclosure relates to a park lock assembly for a vehicle transmission, as well as a method for setting a vehicle transmission in a parked state.

The park lock assembly and associated method according to the disclosure can be arranged or implemented in any type of vehicle having a vehicle transmission, and even if the park lock assembly and associated method is described herein primarily in relation to a car, the assembly and method are not restricted to this particular vehicle, but may alternatively be arranged, installed or implemented in another type of vehicle, such as a truck, a bus, a rail vehicle, a flying vehicle, an off-road vehicle, a working vehicle, or the like.

BACKGROUND

In the field of vehicle transmission, there is a continuous demand for further improved design and functionality in terms of compactness, reliability and reduced cost. For example, it is known from US 2019/0049005 A1 to provide a transmission with park pawl mechanism that is configured to engage with a toothed output gear for providing a park lock functionality, wherein a first sensor monitors actuation of a park pawl linkage, a second sensor monitors engagement of the park pawl with the output gear, and a third sensor monitors rotational speed of the gear. However, despite the activities in the field, there is still room for further improvements of the vehicle transmission, in particular with respect to the park lock assembly.

SUMMARY

An object of the present disclosure is to provide a park lock assembly where the previously mentioned problems are avoided. This object is at least partly achieved by the features of the independent claims.

According to a first aspect of the present disclosure, there is provided a park lock assembly for a vehicle transmission. The park lock assembly comprises a toothed park lock gear, a moveable locking pawl that is moveable between an engaged state, in which the locking pawl is in locking engagement with the park lock gear, and a disengaged state, in which the park lock gear is freely rotatable relative to the locking pawl, and an inductive angular position sensor located on an axial side of the park lock gear and configured for detecting angular position of the park lock gear.

Furthermore, according to a second aspect of the present disclosure, there is provided a method for setting a vehicle transmission in a parked state. The method comprises a first step of, upon receiving a vehicle parking command, operating an electrical propulsion machine drivingly connected with a toothed park lock gear, based on input from an inductive angular position sensor located on an axial side of the park lock gear and configured for detecting angular position of the park lock gear, for setting the toothed park lock gear in an angular position matching the position of a locking pawl associated with the park lock gear, and a second step of actuating a locking pawl actuator for shifting the locking pawl from a disengaged state, in which the park lock gear is freely rotatable relative to the locking pawl, to an engaged state, in which the locking pawl is in locking engagement with the park lock gear.

By means of the features of the independent claims, it becomes possible to monitor rotational position of the park lock gear, and thus to, upon setting the vehicle transmission in a parking mode, control the park lock gear to be set in a rotational position in which the locking pawl may be moved directly to engaged state without interference with the park lock gear. This has the advantage of avoiding that the vehicle moves slightly after setting the transmission in the parking mode and lifting the foot from the brake pedal, because when the locking pawl is controlled to move to the engaged state while the park lock gear is in a non-matching rotational position, the park lock gear, and thus the entire vehicle, may move slightly until the locking pawn may enter a corresponding recess in the park lock gear.

Moreover, the inductive angular position sensor may also be used for detecting rotational speed of the park lock gear by calculating the rate of change of rotational position.

The inductive angular position sensor may also be used for controlling the operation of an electrical propulsion machine that may be drivingly connected with the toothed park lock gear, thereby eliminating the need for a dedicated angular position sensor for the electric machine.

Further advantages are achieved by implementing one or several of the features of the dependent claims.

In some example embodiments, the inductive angular position sensor is further configured for detecting proper engagement of the locking pawl with the park lock gear. Thereby, an additional useful functionality is attributed to the inductive angular position sensor that enables improved safety.

In some example embodiments, the locking pawl is in proper engagement with the park lock gear when an engagement portion of the locking pawl is seated in a recess defined by two neighbouring teeth of the park lock gear.

In some example embodiments, the locking pawl is in proper engagement with the park lock gear when an engagement portion of the locking pawl completely fills the recess defined by two neighbouring teeth of the park lock gear.

In some example embodiments, an output signal of the inductive angular position sensor, with the moveable locking pawl in the engaged state and the park lock gear in the stationary state, differs from the output signal of the inductive angular position sensor, with the moveable locking pawl in the disengaged state and the park lock gear in the stationary state, and wherein this difference in output signal is configured to be used for detecting said proper engagement of locking pawl with the park lock gear. In other words, the output signal of the inductive angular position sensor that indicates the angular position of the park lock gear may be used for detecting proper engagement of the locking pawl as well.

In some example embodiments, the inductive angular position sensor comprises a transmission coil, a first detection coil and a second detection coil, wherein each of said transmission coil, first detection coil and second detection coil are arranged in a radial region corresponding to the teeth of the park lock gear, and wherein each of said transmission coil, first detection coil and second detection coil extend along an arc-shaped region covering at least one tooth of the park lock gear and the position of an engagement portion of the moveable locking pawl in its engaged state. Thereby, the combined functionality of detecting both the angular position of the park lock gear proper engagement of the locking pawl by means of the inductive angular position sensor is made possible.

In some example embodiments, the inductive angular position sensor comprises a printed circuit board, wherein each of said transmission coil, first detection coil and second detection coil is manufactured as one or a set of traces on the printed circuit board, wherein the trace or traces of each of the first and second detection coils has a periodic waveform shape, in particular a sinusoidal shape, for defining a series of detection zones with alternating polarity, wherein a phase of the second detection coil is displaced approximately 90° with respect to a phase of the first detection coil, and wherein each of said transmission coil and first and second detection coils are arranged in parallel with a plane of the park lock gear. The printed circuit board enables a reliable, compact and cost-efficient design of implementation of the inductive angular position sensor.

In some example embodiments, the transmission coil is configured for being excited by a signal, in particular a sinusoidal signal, having a specific frequency, which signal is configured for, via inductive coupling, generating eddy-currents in the adjacent one or more teeth of the park lock gear, and in an engagement portion of the locking pawl when the locking pawl is in the engaged state. This allows contactless and reliable detection of angular position of the park lock gear without need for magnets.

In some example embodiments, the first and second detection coils are configured for detecting a target magnetic field generated by eddy currents induced in the adjacent one or more teeth of the park lock gear, and in an engagement portion of the locking pawl when the locking pawl is in the engaged state. Thereby, the combined functionality of detecting both the angular position of the park lock gear proper engagement of the locking pawl by means of the inductive angular position sensor is made possible.

In some example embodiments, the teeth of the park lock gear, the engagement portion of the locking pawl and first and second detection coils are configured such that said target magnetic field induces a first detection signal, in particular a sinusoidal signal, in the first detection coil, and a second detection signal, in particular a sinusoidal signal, in the second detection coil, and wherein an amplitude of at least one of said first and second detection signals decreases when the moveable locking pawl moves from disengaged state to the engaged state while the park lock gear is in the stationary state. This aspect may be used for verifying engagement of the locking pawl with the park lock gear.

In some example embodiments, the inductive angular position sensor is configured for detecting angular position of the park lock gear by interaction with the teeth of the park lock gear. Consequently, the park lock gear, in particular the teeth of the park lock gear, provide dual functionality as rotational locking engagement for the engagement portion of the locking pawl and encoder wheel pattern used for detecting that angular position by means of the inductive angular position sensor.

In some example embodiments, the inductive angular position sensor is configured for generating eddy-currents in one or more teeth of the park lock gear, detecting the magnetic fields generated by said eddy currents, and subsequently determining angular position of the park lock gear based on the detected magnetic fields.

In some example embodiments, the inductive angular position sensor comprises a transmission coil that is configured for being excited by a signal, in particular a sinusoidal signal, having a specific frequency, which signal is configured for, via inductive coupling, generating eddy-currents in one or more teeth of the park lock gear. This allows contactless and reliable detection of angular position of the park lock gear.

In some example embodiments, the inductive angular position sensor comprises a first detection coil and a second detection coil that are configured for detecting a target magnetic field generated by eddy currents induced in the adjacent one or more teeth of the park lock gear. This allows contactless and reliable detection of angular position of the park lock gear.

The disclosure further relates to a vehicle transmission comprising a first shaft having a first gear in meshing contact with and a second gear that is mounted on a second shaft, wherein the transmission further comprises a park lock assembly according to any of the preceding example embodiments, and wherein the toothed park lock gear is mounted and rotationally secured to the first or second shaft.

The disclosure further relates to a vehicle drivetrain comprising an electrical propulsion machine, an electronic control unit and a park lock assembly as described above, wherein the electrical propulsion machine is drivingly connected or connectable to a vehicle driving wheel via at least a first shaft, wherein the toothed park lock gear is mounted and rotationally secured to the first shaft or another shaft that is driving connectable with the first shaft, and wherein the electronic control unit is configured for, upon receiving a vehicle parking command, first operating the electrical propulsion machine, based on input from the inductive angular position sensor, for setting the toothed park lock gear in an angular position matching the position of the locking pawl, and subsequently actuating a locking pawl actuator for shifting the locking pawl from the disengaged state to the engaged state.

According to some example embodiments, the electronic control unit may further be configured for, after actuation of the locking pawl actuator for shifting the locking pawl from the disengaged state to the engaged state, verifying proper engagement of the locking pawl with the park lock gear based on input from the inductive angular position sensor.

Further features and advantages of the invention will become apparent when studying the appended claims and the following description. The skilled person in the art realizes that different features of the present disclosure may be combined to create embodiments other than those explicitly described hereinabove and below, without departing from the scope of the present disclosure.

BRIEF DESCRIPTION OF THE DRAWINGS

The disclosure will be described in detail in the following, with reference to the attached drawings, in which.

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1:
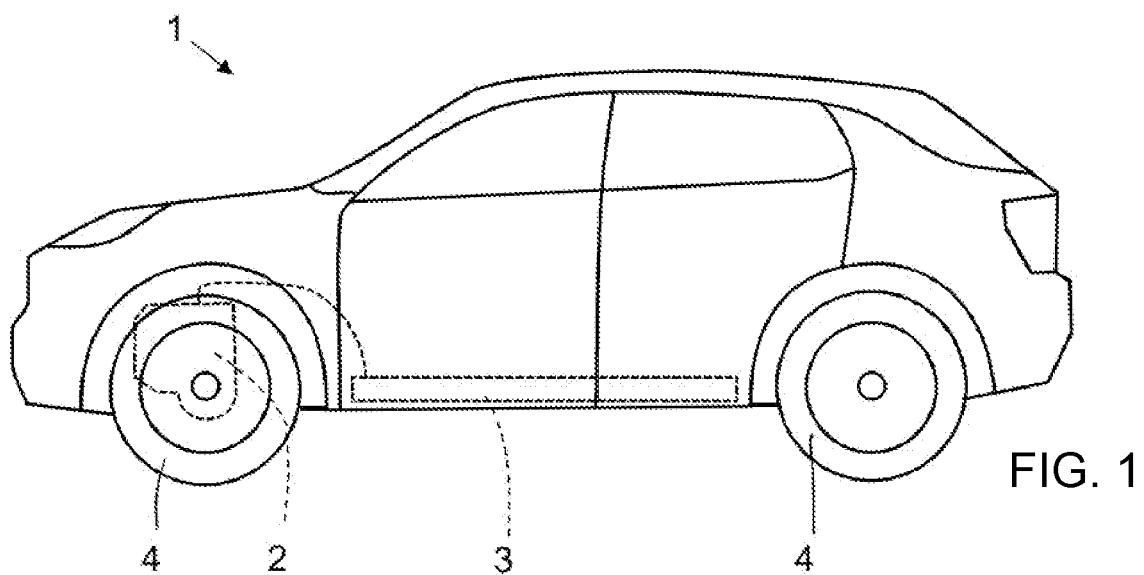
FIG. 1 shows schematically a side view of a vehicle that may include a drivetrain with a transmission having a park lock assembly according to the disclosure.

The park lock assembly for a vehicle transmission and associated method for setting a vehicle transmission in a parked state may according to one example embodiment be implemented in a transmission for a car 1, as schematically illustrated in FIG. 1. A transmission park lock assembly serves to automatically provide rotational locking of the wheels of the vehicle when setting the transmission in a parked state, such that the vehicle cannot roll away in case of for example parking in a slope. The transmission park lock assembly thus functions as a safety feature for preventing the vehicle to move in case the driver forgets engaging the conventional parking brake, which are also known as vehicle emergency brake and which generally involve activating the friction brakes, i.e. service brakes, at one or more vehicle wheels.

Figure 2:
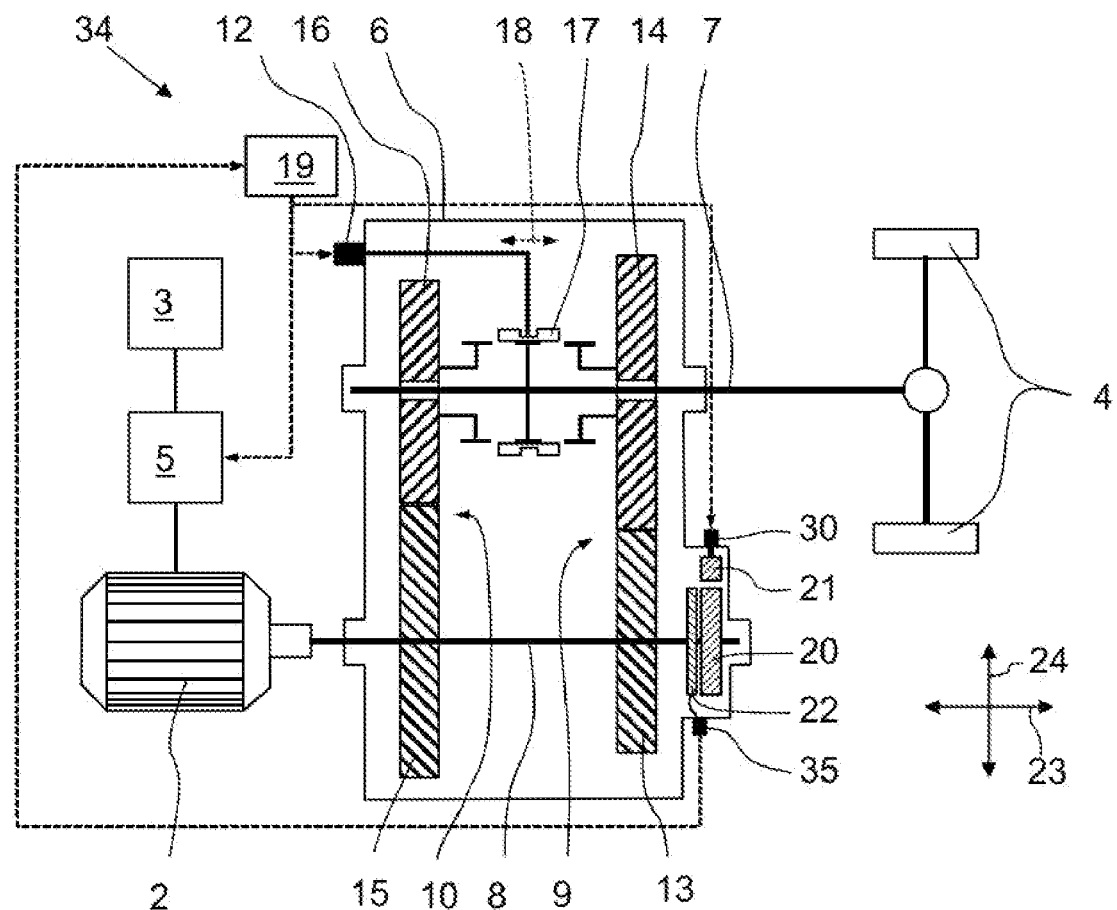
FIG. 2 shows schematically an example layout of a drivetrain with a transmission having park lock assembly according to the disclosure.
Figure 3A:
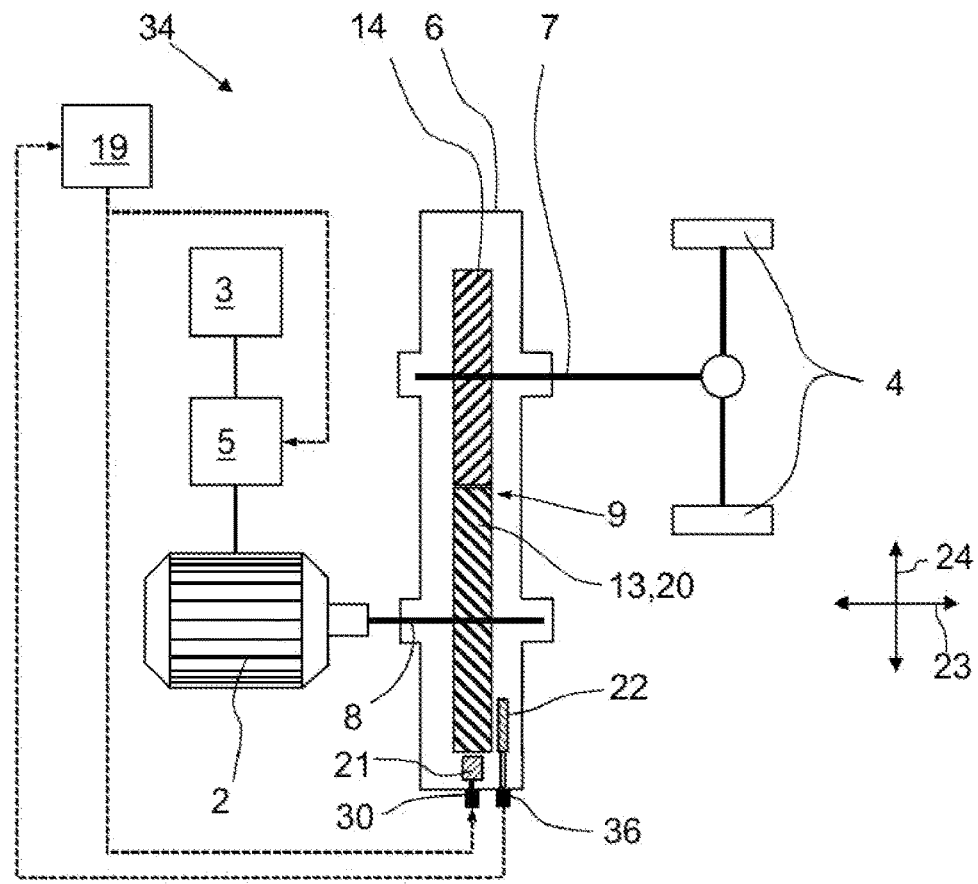
FIGS. 3A-3B show schematically two further example layouts of such a drivetrain according to the disclosure.

The car 1 may be an electric vehicle or a hybrid electric vehicle having an electrical propulsion machine 2 powered by an electrical storage system, such as a battery 3, and drivingly connected with driving wheels 4 of the car via a transmission, such as a multi-gear transmission having a plurality of discrete gears, each with a unique gear ratio, as schematically illustrated in FIG. 2. The transmission may include or be connected to a single clutch or dual clutch arrangement (not showed) for simplifying gear shifts. Alternatively, the vehicle may include a conventional combustion engine powered drivetrain. Clearly, the park lock assembly and method according to the disclosure is not limited to a multi-gear transmission or a front wheel driven car, or even a car at all, but may alternatively be implemented in many other types of transmissions and drivetrain layouts. For example, the transmission may be a single gear transmission, as schematically illustrated in FIG. 3A, or in a continuously variable transmission, or the like.

Merely for illustrating an example implementation of the park lock assembly in a transmission, FIG. 2 shows a schematic illustration of the park lock assembly being installed in a two-gear transmission 6 of a drivetrain 34 of automated manual transmission ATM. The drive train comprises an electric propulsion machine 2 as propulsion source, a transmission 6 and a set of driving wheels 4. The transmission 6 according to this example embodiment has a closed transmission housing enclosing a first shaft 8, a second shaft 7, a constant mesh first gear assembly 9 having a first gear ratio, a constant mesh second gear assembly 10 having a second gear ratio.

The first gear assembly 9 includes a first gear 13 rotationally secured to the first shaft 8 and in constant mesh with a freewheeling second gear 14 arranged on, and rotatable relative to, said second shaft 7. The second gear assembly 10 includes a third gear 15 that is rotationally secured to the first shaft 8 and in constant mesh with a freewheeling fourth gear 16 that is arranged on, and rotatable relative to, said second shaft 7.

An axially displaceable shift sleeve 17 arranged on and rotationally secured to the second shaft 7 may be axially displaced in both directions along a shift direction 18 by means of a shifting actuator 12 for being selectively rotationally connected to either the second or the fourth gear 14, 16, for selectively changing the total gear ratio between the first shaft 8 and second shaft 7.

An electronic control unit 19, such as a transmission control unit, is provided for controlling operation of the transmission 6, in particular operation of the shifting actuator 12. The same control unit 19 may be arranged to also control operation of an electric power converter 5, such as for example an inverter, that is arranged for controlling the voltage and current supplied from the battery 3, in particular high-voltage battery 3, to the electric machine 2. Alternatively, a more distributed system may be used, in which a separate electronic control unit, with which the transmission control unit is communicatively connected, may be used for control of the power source 2.

As schematically illustrated in FIG. 2, a park lock assembly for a vehicle transmission according to the disclosure may be installed within the transmission housing. In this example embodiment, the park lock assembly comprises a toothed park lock gear 20 and a moveable locking pawl 21 that is moveable between an engaged state, in which the locking pawl 21 is in locking engagement with the park lock gear 20, and a disengaged state, in which the park lock 20 gear is freely rotatable relative to the locking pawl 21. The park lock assembly further comprises an inductive angular position sensor 22 located on an axial side of the park lock gear 20 and configured for detecting angular position of the park lock gear 20.

Consequently, the vehicle transmission may be deemed comprising a first shaft 8 having a first gear 13 in meshing contact with and a second gear 14 that is mounted on a second shaft 7, wherein the transmission further comprises a park lock assembly, and wherein the toothed park lock gear 20 is mounted and rotationally secured to the first shaft 8.

Clearly, in the example embodiment of FIG. 2, the shift sleeve 17 must be rotationally connected to either the second or the fourth gear 14, 16 in the transmission park mode for ensuring that rotational locking of the first shaft 8 by means of the park lock assembly also results in rotational locking of the second shaft 7. Alternatively, the park lock assembly may be installed on the second shaft 7 instead, thereby eliminating the need to also control the shift sleeve 17.

Similarly, the park lock assembly may be installed on the second shaft 7 of the transmission of FIG. 3A instead of on the first shaft 8.

The moveable locking pawl 21 may for example be pivotally moveable, or linearly moveable, or the like, for moving between said engaged and disengaged state.

The term "located on an axial side of the park lock gear 20" herein refers to being located axially displaced from the park lock gear 20, as seen in an axial direction 23 that is parallel with the direction of elongation of the shaft, i.e. parallel with the first shaft 8 as shown in FIG. 2, on which first shaft 8 the park lock gear 20 is rotationally fastened. In other words, a distributed flat sensing surface 25 of the inductive angular position sensor 22 is facing in an axial direction 23 towards an axial side surface of the park lock gear 20.

The inductive angular position sensor 22 may, or may not, extend also on a radial side of the park lock gear 20, in a radial plane defined by the park lock gear 20, as seen in a radial direction 24 that is perpendicular to the axial direction 23.

The inductive angular position sensor 22 is stationary mounted within the transmission housing, and the park lock gear 20 is rotatably mounted in the transmission housing, for example by being rotationally secured on a rotatable shaft, such as the first shaft 8.

The angular position sensor 22 may be mounted on the shaft, meaning that the angular position sensor 22 has hole or recess arranged for allowing the rotational shaft of the rotor, i.e. park lock gear 20, to extend past the angular position sensor 22. Such a scenario is shown in FIGS. 2 and 3 and is sometimes referred to as "through shaft sensor".

The angular position sensor 22 may alternatively be mounted axially outside an end of the shaft, meaning that the rotational shaft of the rotor does not extend past the angular position sensor 22. Such a scenario is sometimes referred to as "end of shaft sensor".

The angular position sensor 22 may have a substantially circular disc-shaped form, as schematically illustrated in FIGS. 2, 5A-5D, 6A-6B and 8, wherein the flat sensing surface 25 extends over substantially the entire circumferential length of the axial side of the park lock gear 20, i.e. over a range of about 270-360 degrees of the axial side surface of the park lock gear 20.

Alternatively, the angular position sensor 22 may have a shape more resembling a circular segment, as schematically illustrated in FIGS. 3, 4, 10A-10B, 11A and 12A, wherein the flat sensing surface 25 extends over an arc-shaped region of the axial side of the park lock gear 20, i.e. over a range of about 45-180 degrees of the axial side surface of the park lock gear 20.

Figure 4:
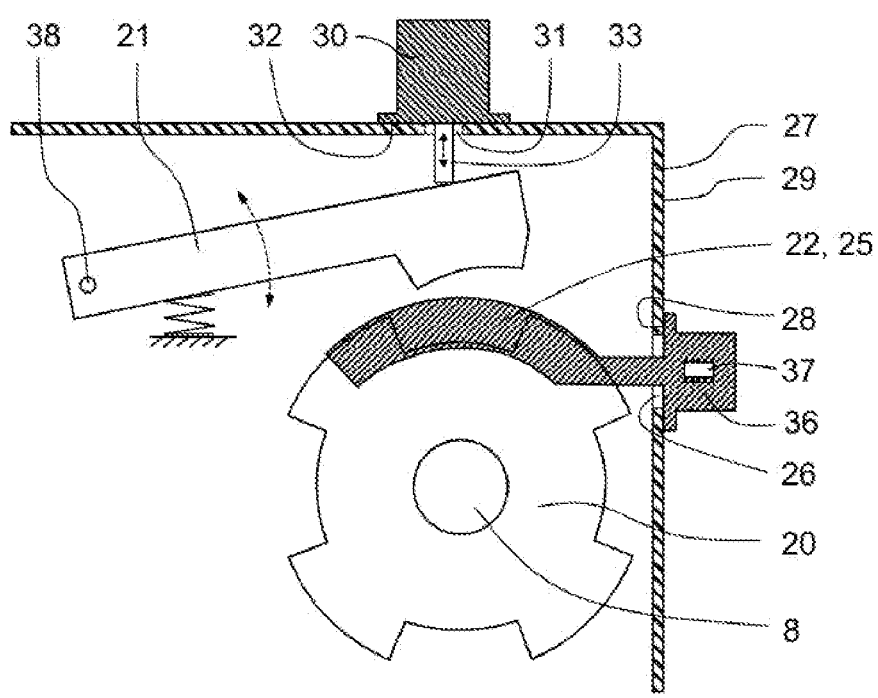
FIG. 4 shows schematically an example interior design of a transmission housing having the park lock assembly according to the disclosure.

When the angular position sensor 22 has a shape resembling a circular segment, as for example illustrated in FIG. 4, the angular position sensor 22 may be installed through a hole or opening 26 in an outer wall 27 of the transmission housing, thereby simplifying installation, replacement, service, adjustment, etc. of the angular position sensor 22. Installation may then for example be performed by inserting the angular position sensor 22 through the hole 26 until an abutment surface 28 of an integral connection interface 36 of the angular position sensor 22 contacts an exterior surface 29 of the outer wall 27, and subsequently fastening the angular position sensor 22 in that position, for example via threaded fasteners. In the fastened state, the sensing surface 25 is arranged within the transmission housing and extends over an arc-shaped region of the axial side of the park lock gear 20, as showed in FIG. 4.

Similarly, a locking pawl actuator 30 for shifting the locking pawl 21 from the disengaged state to the engaged state may also, or alternatively, be installed through a hole or opening 31 in the outer wall 27 of the transmission housing, as schematically showed in FIG. 4. Installation of the locking pawl actuator 30 may then for example be performed by inserting the locking pawl actuator 30 partly through the hole 31 until an abutment surface 32 of the a locking pawl actuator 30 contacts an exterior surface 29 of the outer wall 27, and subsequently fastening the locking pawl actuator 30 in that position, for example via threaded fasteners. In the fastened position, a moveable actuator pin 33 of the locking pawl actuator 30 may move for example linearly for engaging the locking pawl 21 for moving, e.g. pivoting, the locking pawl 21 between the disengaged state, as showed in FIG. 4, and engaged state. Specifically, the locking pawl 21 may be pivotable moveable around a pivot axis 38.

When the angular position sensor 22 is fastened within the transmission housing instead, as schematically shown in the example embodiments of FIGS. 2 and 3, a separate connection interface 35 may be arranged at a suitable location of the outer wall 27 of the transmission housing, which connection interface is electrically connected with the angular position sensor 22 via a signal cable or the like.

Signals from the angular position sensor 22 may for example be supplied to the electronic control unit 19, or to the electric power converter 5, as feedback for improved torque, speed and/or rotational position control of the electric machine 2.

Furthermore, control signals for actuation control of the locking pawl actuator 30 may be provided by the electronic control unit 19 and forwarded to the locking pawl actuator 30 by suitable signal transmission cables, or the like.

Consequently, the disclosure relates to a vehicle drivetrain 34 comprising an electrical propulsion machine 2, an electronic control unit 19 and a park lock assembly as described above, wherein the electrical propulsion machine 2 is drivingly connected or connectable to a vehicle driving wheel 4 via at least a first shaft 8, wherein the toothed park lock gear 20 is mounted and rotationally secured to the first shaft 8 or another shaft that is driving connectable with the first shaft 8, and wherein the electronic control unit 19 is configured for, upon receiving a vehicle parking command, first operating the electrical propulsion machine 2, based on input from the inductive angular position sensor 22, for setting the toothed park lock gear 20 in an angular position matching the position of the locking pawl 21, and subsequently actuating a locking pawl actuator 30 for shifting the locking pawl 21 from the disengaged state to the engaged state.

A vehicle parking command may for example be deemed received when a transmission gear selector is moved to a parking position.

Moreover, the electronic control unit 19 may further be configured for, after actuation of the locking pawl actuator 30 for shifting the locking pawl 21 from the disengaged state to the engaged state, verifying proper engagement of the locking pawl 21 with the park lock gear 20 based on input from the inductive angular position sensor 22.

As mentioned above, the transmission may include merely a single gear assembly 9, i.e. a fixed gear ratio, as schematically showed in FIG. 3A, but the park lock assembly according to the disclosure may nevertheless be implemented within the transmission housing for proper transmission park lock of the vehicle in parked state.

Moreover, the toothed park lock gear 20 may be a dedicated toothed gear or disc provided in the transmission only for accomplishing the transmission park lock functionality combined with angular position detection, as schematically illustrated in the example embodiment of FIG. 2.

Alternatively, in certain applications, the toothed park lock gear 20 may additionally be a torque transfer gear 13 of a torque transmission gear assembly. In other words, the park lock gear 20 may in certain applications be not only a toothed gear for accomplishing the transmission park lock functionality combined with angular position detection, but also a positive torque transfer gear 13 for transmitting torque from a first shaft 8 of the transmission to a second shaft 7 and further to the driving wheels 4 of the vehicle, as schematically illustrated in the example embodiment of FIG. 3A. In such a scenario, the locking pawl 21 must, as always, have an engagement portion that is matching the toothed park lock gear 13, 20. Furthermore, the tooth thickness of the park lock gear may preferably, but not strictly necessary, be relatively large for avoiding less accurate angular position detection by means of the inductive angular position sensor 22 due to cross-interference of magnetic fields generated by eddy currents induced in said teeth.

Figure 3B:
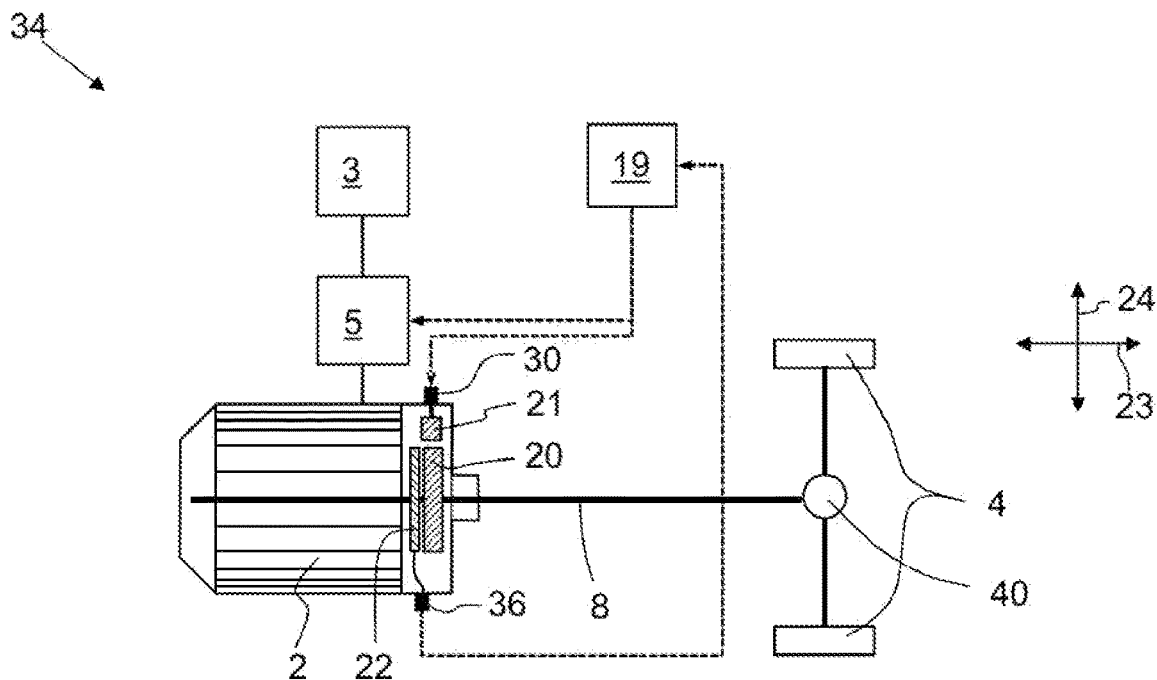

Moreover, according to some example embodiments, the park lock assembly may be installed in an electric drive axle, as schematically illustrated in FIG. 3B. An electric drive axle refers herein to a drivetrain 34 comprising an electrical propulsion machine 2 connected directly to a driving wheel, with or without an intermediate differential gear unit 40.

In other words, the drivetrain 34 may comprises an electrical propulsion machine 2, an electronic control unit 19 and a park lock assembly, wherein the electrical propulsion machine 2 is drivingly connected a driving wheel 4 via a first shaft 8, wherein the toothed park lock gear 20 is mounted and rotationally secured to the first shaft 8, and wherein the electronic control unit 19 is configured for, upon receiving a vehicle parking command, first operating the electrical propulsion machine 2, based on input from the inductive angular position sensor 22, for setting the toothed park lock gear 20 in an angular position matching the position of the locking pawl 21, and subsequently actuating a locking pawl actuator 30 for shifting the locking pawl 21 from the disengaged state to the engaged state.

The park lock assembly may thus according to some example embodiments be integrated with the electrical propulsion machine 2 in a common housing.

In FIG. 4, the inductive angular position sensor 22 has a flat arc-shaped sensing surface 25 and an integral connection portion 36 forming a one-piece rigid part. The flat arc-shaped sensing surface 25 includes a coil for generating eddy currents in the teeth of the park lock gear 20 and at least one coil for detection of magnetic fields generated by said eddy currents. The inductive angular position sensor 22 may include an integrated circuit 37 arranged for example at the integral connection portion 36 and configured for supplying angular position data of the park lock gear 20.

Figure 5A:
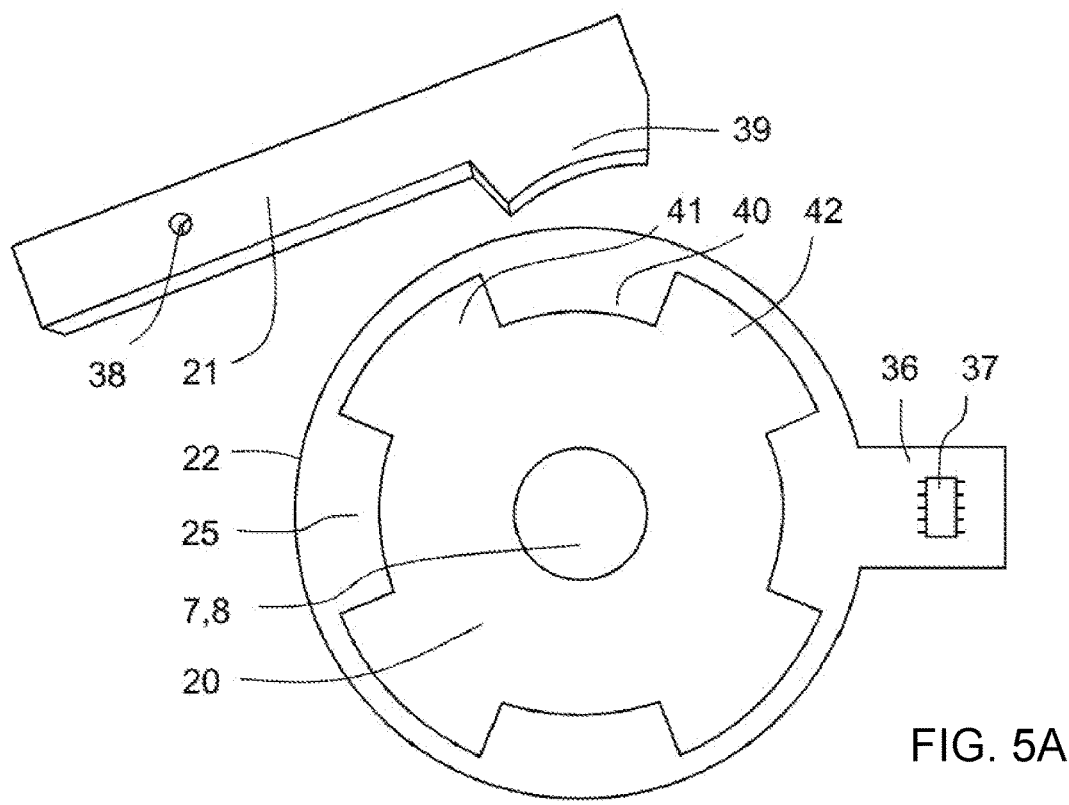
FIGS. 5A-5D show schematically various views of an example embodiment of the park lock assembly according to the disclosure in non-engaged and engaged states.
Figure 5B:
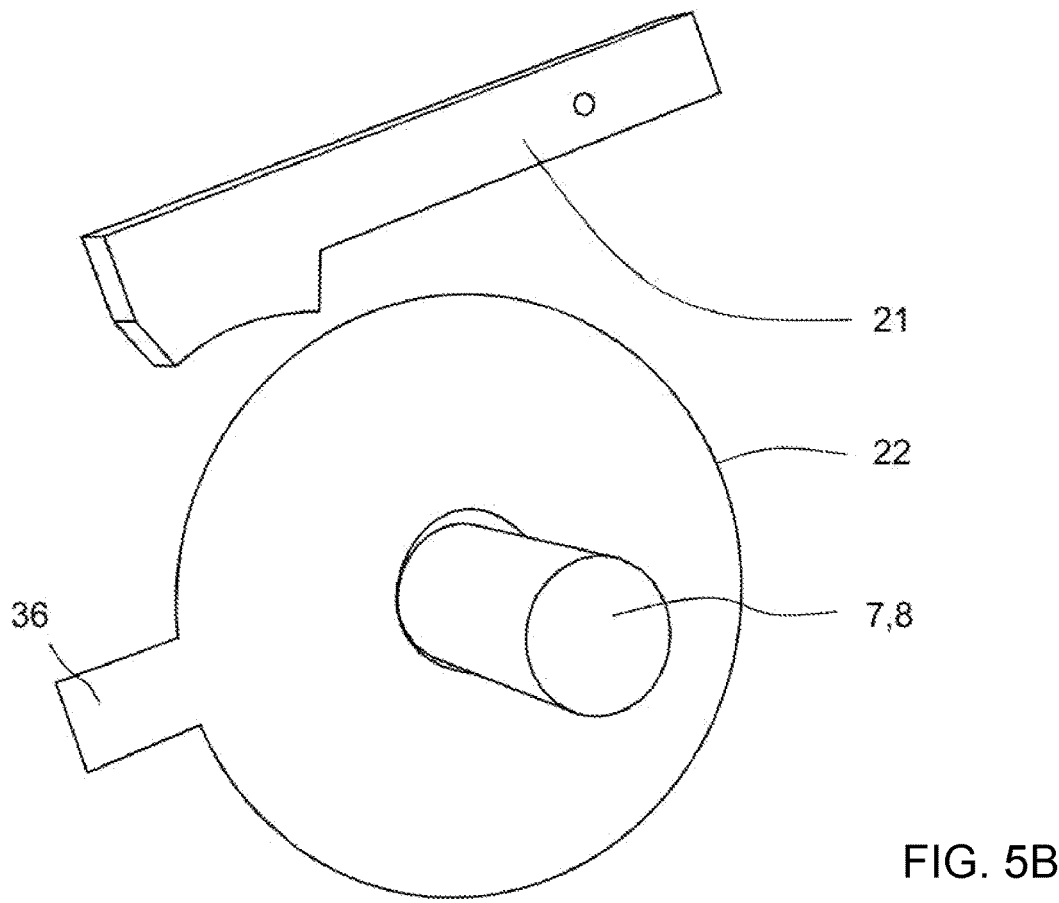

FIGS. 5A-5D shows a further example embodiment of the park lock assembly for a vehicle transmission according to the disclosure in various views and operating states. Specifically, FIG. 5A shows a side-view of the park lock assembly in a non-engaged state and with the park lock gear 20 arranged in front of the disc-shaped inductive angular position sensor 22, and FIG. 5B shows a perspective view of the same the park lock assembly in the same operating state from the opposite direction, i.e. with the disc-shaped inductive angular position sensor 22 arranged in front of the concealed park lock gear 20, and the first or second shaft 7, 8 extending through the inductive angular position sensor 22.

Figure 5C:
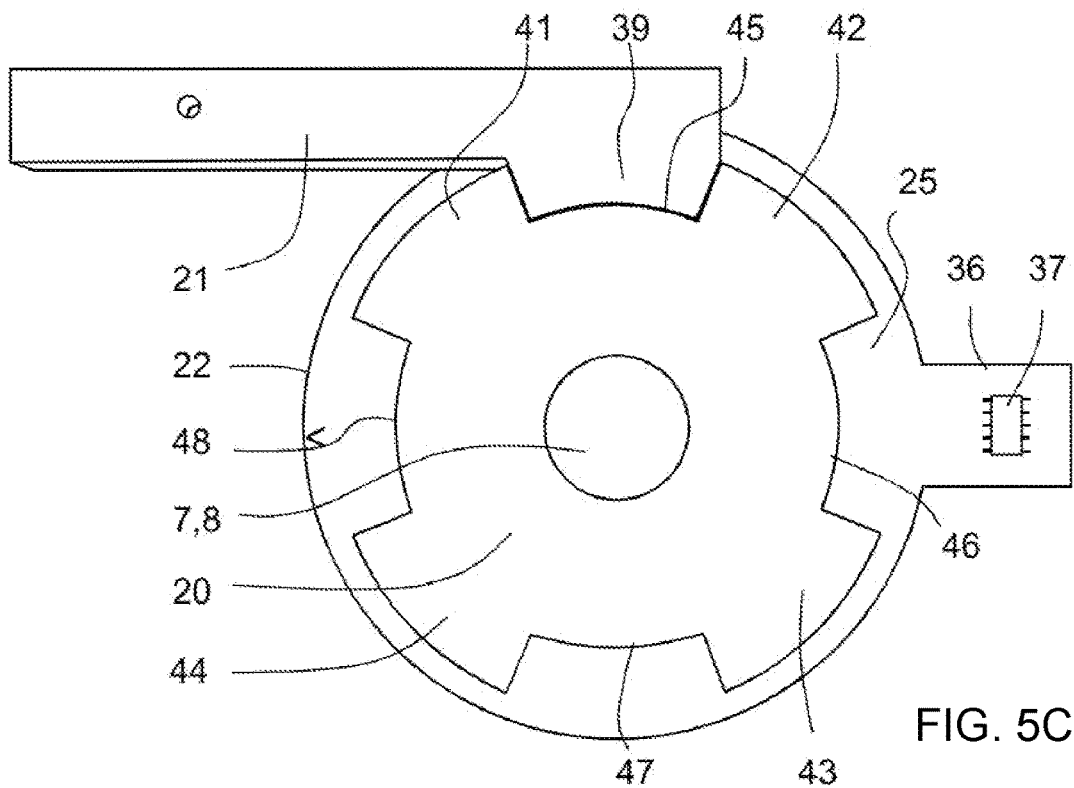
Figure 5D:
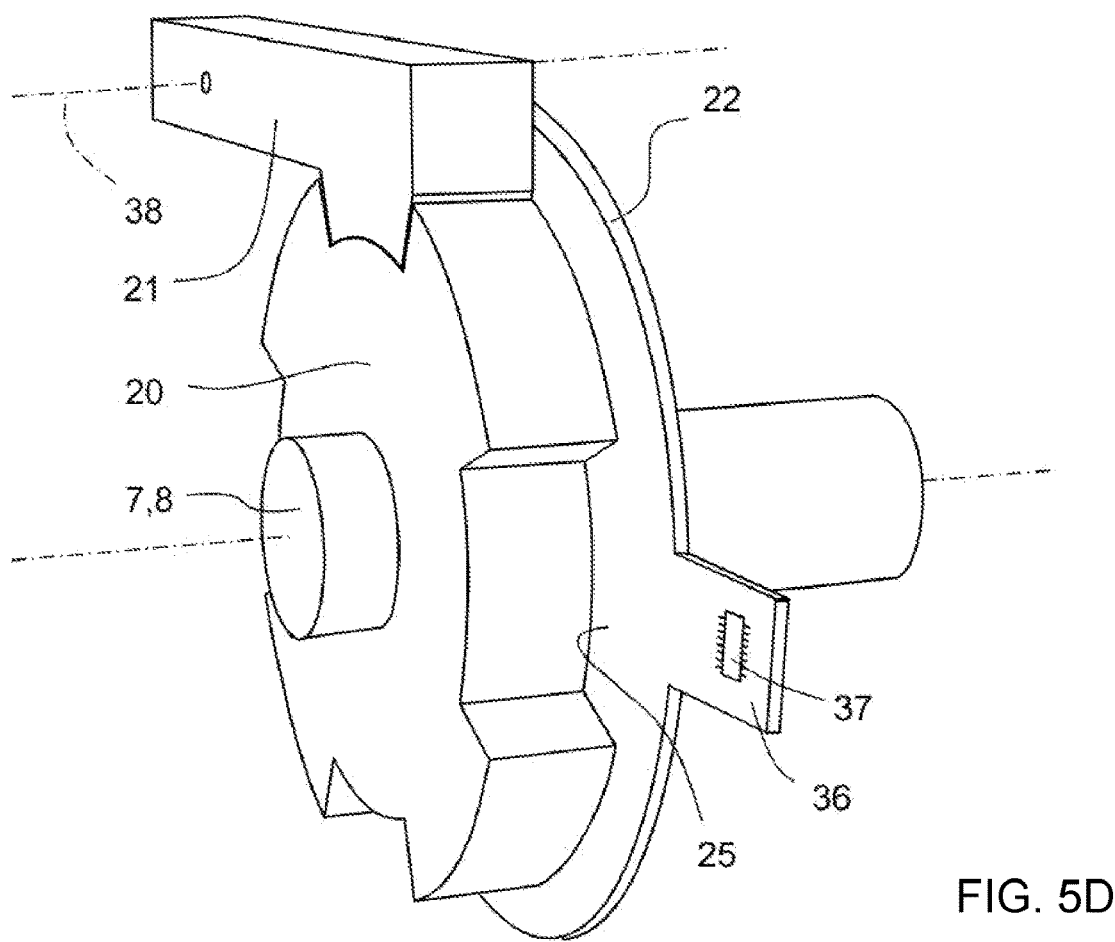

In addition, FIG. 5C shows a side-view of the park lock assembly in an engaged state and with the park lock gear 20 arranged in front of the disc-shaped inductive angular position sensor 22, and FIG. 5D shows a perspective view of the same the park lock assembly in the same operating state, i.e. with the park lock gear 20 arranged in front of the disc-shaped inductive angular position sensor 22.

In each of FIGS. 5A-5D, the inductive angular position sensor 22 has a substantially annular flat sensing surface 25 with an integral connection portion 36 forming a one-piece rigid part. The inductive angular position sensor 22 may include an integrated circuit 37 arranged for example at the integral connection portion 36 and configured for supplying angular position data of the park lock gear 20.

For each of FIGS. 5A-5D, the park lock gear 20 is rotationally fastened to the first or second shaft 7, 8, which extends through the stationary inductive angular position sensor 22, such that the park lock gear 20 may rotate relative to the inductive angular position sensor 22.

By means of the various example embodiments of the park lock assembly for the vehicle transmission described above with reference to FIGS. 1-5D, it becomes possible to monitor rotational position of the park lock gear 20, and thus to, upon setting the vehicle transmission in a parking mode, control the park lock gear 20 to be set in a rotational position in which the moveable locking pawl 21 may be moved directly to engaged state without interference with the park lock gear, thereby avoiding any vehicle movement otherwise caused when moving the locking pawl 21 towards the engaged state while the park lock gear is in a non-matching rotational position.

Figure 14:
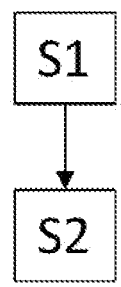
FIGS. 14-15 show the basic steps of various methods according to the disclosure.

In other words, a method for setting a vehicle transmission in a parked state may for example be accomplished by a process described with reference to FIG. 14 and involves a first step S1 of, upon receiving a vehicle parking command, operating an electrical propulsion machine 2 drivingly connected with a toothed park lock gear 20, based on input from an inductive angular position sensor 22 located on an axial side of the park lock gear 20 and configured for detecting angular position of the park lock gear 20, for setting the toothed park lock gear 20 in an angular position matching the position of a locking pawl associated with the park lock gear.

Moreover, the method for setting a vehicle transmission in a parked state may involve a second step S2 of actuating the locking pawl actuator 30 for shifting the locking pawl 21 from the disengaged state, in which the park lock gear 20 is freely rotatable relative to the locking pawl 21, to an engaged state, in which the locking pawl 21 is in locking engagement with the park lock gear 20.

Figure 15:
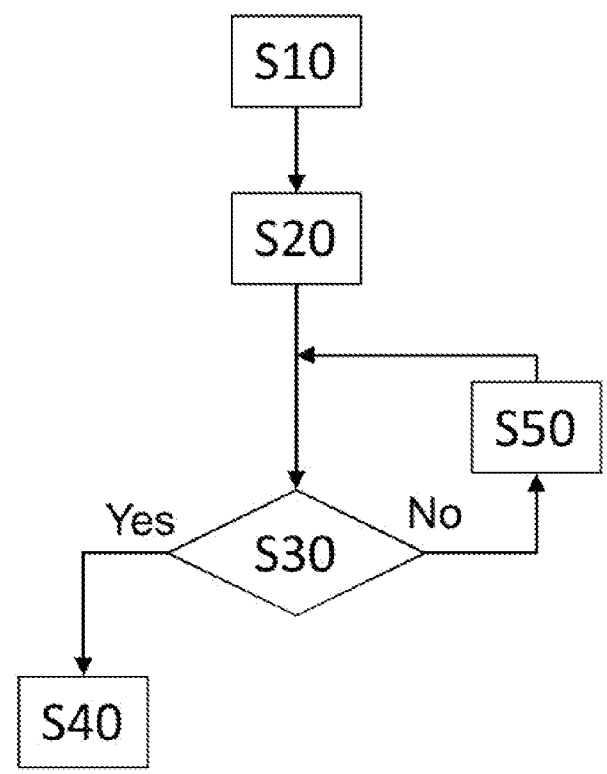

A more specific description of a method for setting a vehicle transmission in a parked state may for example be accomplished by a process described with reference to FIG. 15 and involves a first step S10 of receiving instructions for setting the park lock assembly in a parked state, i.e. shifting the locking pawl 21 from non-engaged state to the engaged state with the park lock gear 20, a second step S20 of obtaining by means of the inductive angular position sensor 22 the current angular position of the park lock gear 20, a third step S30 of comparing the obtained current angular position of the park lock gear 20 with a predetermined angular position range, which range is deemed resulting in immediate engagement of the locking pawl 21 in a recess between neighbouring teeth of the park lock gear 20, a fourth step S40 of controlling the locking pawl actuator 30 for shifting the locking pawl 21 from the disengaged state to the engaged state when the obtained current angular position of the park lock gear 20 is located within the predetermined angular position range; and a fifth step S50 of controlling the output shaft of the electric traction machine 2 to rotate slightly when the obtained current angular position of the park lock gear 20 is located outside the predetermined angular position range, until the obtained current angular position of the park lock gear 20 is located within the predetermined angular position range, and subsequently proceeding to the fourth step S40 of controlling the locking pawl actuator 30 for shifting the locking pawl 21 from the disengaged state to the engaged state when the obtained current angular position of the park lock gear 20 is located within a predetermined angular position range.

Said fifth step S50 of controlling the output shaft of the electric traction machine 2 to rotate slightly when the obtained current angular position of the park lock gear 20 is located outside the predetermined angular position range, until the obtained current angular position of the park lock gear 20 is located within the predetermined angular position range, may be performed while having the vehicle friction brakes applied for avoiding vehicle movement caused by said slight rotation of the electric traction machine 2. This slight rotational movement, which typically involves not more than 45 degrees angular motion for a park lock assembly having the design of FIGS. 5A-5D, may be performed by using the accumulated flexibility, play and backlash within the drivetrain from the park lock gear 20 to the vehicle wheels 4, such as the play and backlash in gears and shift sleeve within the transmission, play and backlash within a differential gearbox, play and backlash in any constant velocity joint(s), play associated with the friction brakes, torsional flexibility of shafts, etc.

Reliable information about the rotational position of the park lock gear 20 may also be beneficial and used for other purposes within the drivetrain and/or transmission. For example, in case the transmission is a multi-step transmission having an axially displaceable shift sleeve 17 arranged on and rotationally secured to the second shaft 7 and axially displaced in at least one direction along a shift direction 18 by means of a shifting actuator 12 for being selectively rotationally connected to a freewheeling gear 14, 16, as described with reference to FIG. 2, the rotational position of the park lock gear 20 may be used for detecting the angular position of said freewheeling gear 14, 16 for enabling smoother and more silent gear shifts by actuating the axial displacement of the shift sleeve 17 at a time point that results in direct and interference-free engagement with said freewheeling gear 14, 16.

The various example embodiments of the park lock assembly for the vehicle transmission described above with reference to FIGS. 1-5D additionally enables the inductive angular position sensor 22 to have dual functionality, because the output signal of the inductive angular position sensor 22 may also be used for detecting rotational speed of the park lock gear 20 by calculating the rate of change of rotational position over time, i.e. rotational speed [rad/s].

The inductive angular position sensor 22 may also be used for controlling the operation of an electrical propulsion machine 2 that may be drivingly connected with the toothed park lock gear 20, thereby eliminating the need for a dedicated angular position sensor for the electric machine 2. This is primarily relevant when the park lock gear 20 and the electrical propulsion machine 2 are fastened to the same shaft, or when the park lock gear 20 and the electrical propulsion machine 2 are fastened to individual shafts that are connected via a 1:1 gear ratio.

With reference again to the example embodiments of the park lock assembly showed in FIGS. 1-5D, the inductive angular position sensor 22 may further be configured for detecting proper engagement of the locking pawl 21 with the park lock gear 20. In other words, the inductive angular position sensor 22 may be arranged to have triple functionality, namely: 1) detecting angular position of the park lock gear 20, 2) detecting rotational speed of the park lock gear 20, and 3) detecting proper engagement of the locking pawl 21 with the park lock gear 20.

Detection of proper engagement of the locking pawl 21 with the park lock gear 20 may be used for improving vehicle safety associated with vehicle parking or vehicle stand still, i.e. when the transmission is set in parking mode by the driver or by a vehicle driving system. Without such detection of proper engagement, the vehicle may start to roll in case of malfunction of the park lock functionality, because the service (friction) brakes are typically not engaged during vehicle parking mode. Hence, detection of proper engagement of the locking pawl 21 with the park lock gear 20 may be seen as a further vehicle safety feature.

The locking pawl 21 may be deemed being in proper engagement with the park lock gear 20 when an engagement portion 39 of the locking pawl 21 is seated in a recess 45 defined by two neighbouring teeth 41, 42 of the park lock gear 20.

The park lock gear 20 illustrated in the example embodiment of FIG. 5C has four teeth 41-44 and four recesses 45-48, wherein first and second teeth 41, 42 are two neighbouring teeth that jointly define a first recess 45, wherein second and third teeth 42, 43 are two neighbouring teeth that jointly define a second recess 46, wherein third and fourth teeth 43, 44 are two neighbouring teeth that jointly define a third recess 47, and wherein fourth and first teeth 44, 41 are two neighbouring teeth that jointly define a forth recess 48. However, this example embodiment of the park lock gear is merely described as an example embodiment, and the disclosure is of course not restricted to a park lock gear 20 having four teeth and four recesses.

The term "proper engagement" means herein that the engagement portion 39 of the locking pawl 21 is fully seated in the recess 45 and may not be inserted any further into the recess 45 defined by two neighbouring teeth 41, 42.

In other words, according to some example embodiments, the locking pawl 21 is in proper engagement with the park lock gear 20 when the engagement portion 39 of the locking pawl 21 completely fills the recess 45 defined by two neighbouring teeth 41, 42 of the park lock gear 20, at least to the maximal possible extent.

Consequently, the inductive angular position sensor 22 may be configured enabling detection of non-proper engagement of the locking pawl 21 with the park lock gear 20, such as for example when the engagement portion 39 of the locking pawl 21 is completely outside of the recess 45 defined by two neighbouring teeth 41, 42, or when the engagement portion 39 is merely partially inserted into said recess 45 and further insertion motion is possible.

Non-proper engagement of the locking pawl 21 with the park lock gear 20 may be deemed being a risk for subsequent unintentional movement of the vehicle, and detection of such non-proper engagement of the locking pawl 21 may therefore be advantageous features of the present disclosure.

Figure 6A:
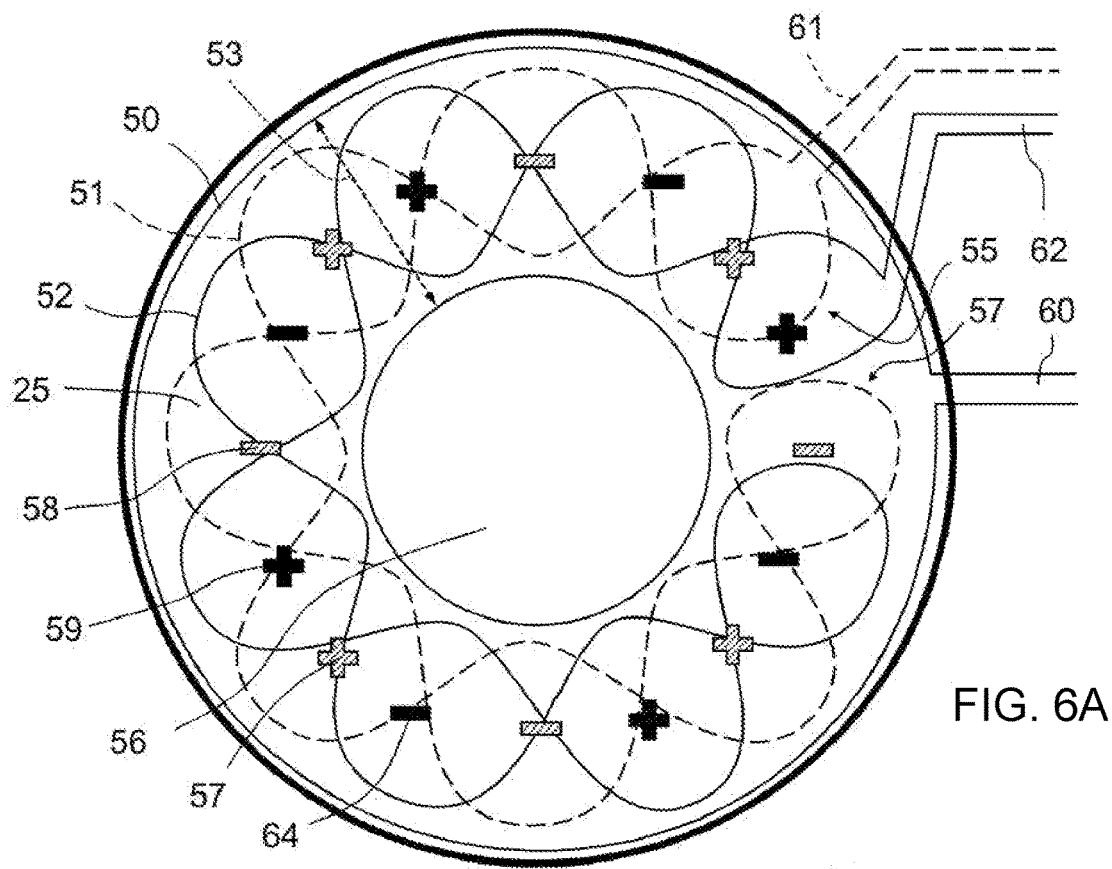
FIGS. 6A-6B show schematically an example embodiment of the inductive angular position sensor according to the disclosure, without and with a park lock gear.
Figure 6B:
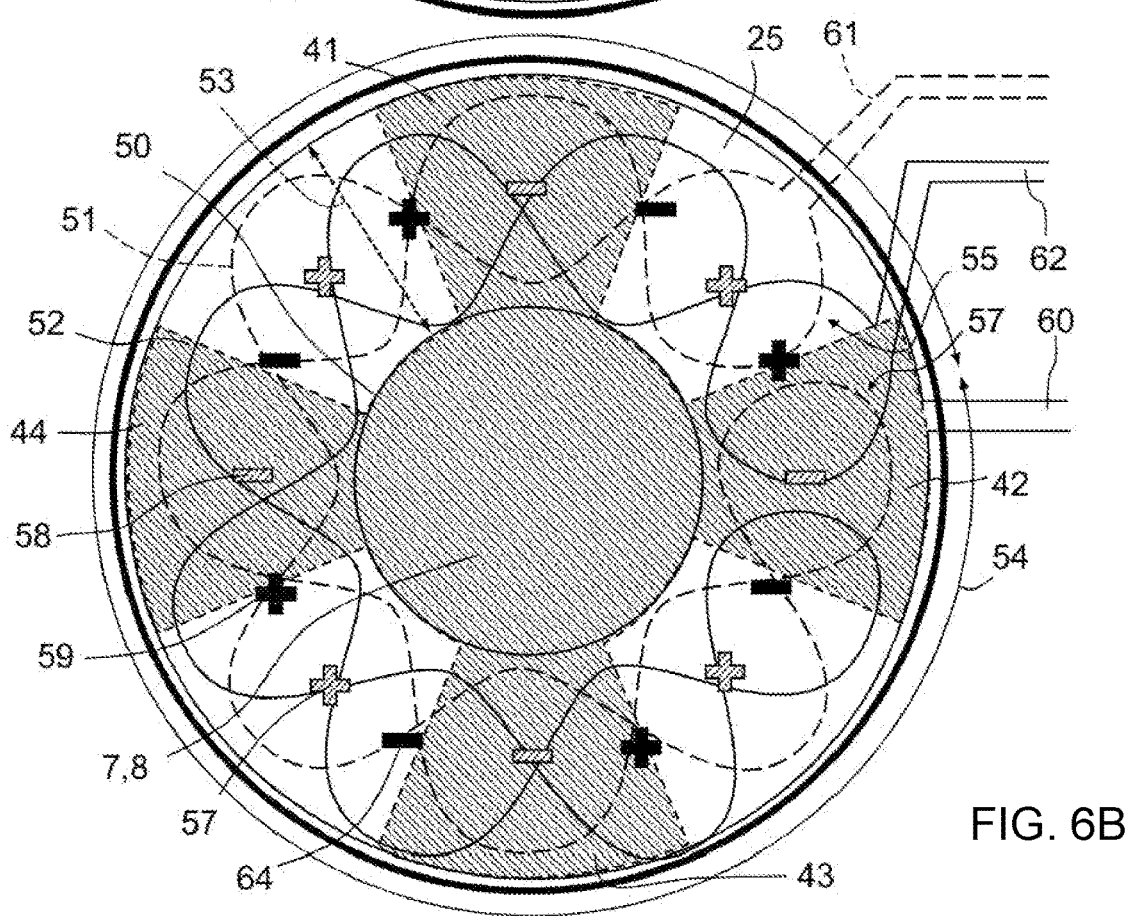

FIG. 6A shows a side view of more detailed view of the structure of an example embodiment of an inductive angular position sensor 22 according to the disclosure, and FIG. 6B shows the same sensor 22 but with an example embodiment of a park lock gear 20 arranged overlapping for illustrating the angular position detection functionality of the sensor 22. Both the inductive angular position sensor 22 and park lock gear 20 are thus arranged in a plane perpendicular to the axial direction 23.

The inductive angular position sensor 22 may comprise a transmission coil 50, a first detection coil 51 and a second detection coil 52, wherein each of said transmission coil 50, first detection coil 51 and second detection coil 52 are arranged in a radial region 53 corresponding to a radial region of the teeth of the park lock gear 20, and wherein each of said transmission coil 50, first detection coil 51 and second detection coil 52 extend along an arc-shaped region 54 covering at least one tooth of the park lock gear and the position of an engagement portion of the moveable locking pawl in its engaged state.

In the example embodiment of FIGS. 6A-6B, said arc-shaped region 54 extends around the entire disc-shaped sensing surface 25, i.e. about 360 degrees.

Each of the transmission coil 50, first detection coil 51 and second detection coil 52 may be made of single or multi-lead wires or other type of electrical conductors that are fastened to in a specific pattern adjacent the sensing surface 25 that extends in a plane perpendicular to the axial direction 23. Moreover, one or more of said transmission coil 50, first detection coil 51 and second detection coil 52 may be composed of a single loop of a plurality of loops for providing a desired magnetic field strength and detecting a desired magnetic field strength. In the example embodiments of FIGS. 6A-6B, 10A-10B, 11A, 12A, said coils 50-53 are illustrated as including merely a single loop made of a single wire for simplified understanding.

In fact, for simplified manufacturing and robustness, each of said transmission coil 50, first detection coil 51 and second detection coil 52 may be manufactured as one or a set of traces on a printed circuit board (PCB). A trace on a PCB is the equivalent of a wire for conducting signals and consists typically of a flat, narrow part of the copper foil that remains after etching.

In the example embodiment of FIGS. 6A-6B, the trace making up the transmission coil 50 may have a circular loop-shape that is configured to generate a magnetic field. Electric current flowing in the circular loop creates a magnetic field which is more concentrated in the centre of the loop than outside the loop, wherein all parts of the loop contribute magnetic field in the same direction inside the loop. The direction of magnetic field is directly linked to the direction of current in the loop.

The trace making up the first and second detection coils 51, 52 have a periodic waveform shape, in particular a sinusoidal shape, for defining a series of detection zones with alternating polarity, wherein a phase of the second detection coil 52 is displaced approximately 90° with respect to a phase of the first detection coil 51, and wherein each of said transmission coil 50 and first and second detection coils 51, 52 are arranged in parallel with a plane of the park lock gear 20.

In other words, the trace making up each of the first and second detection coils 51, 52 have a sinusoidal periodic waveform shape extending along the circumferential direction of the sensing surface 25.

In the example embodiment of FIG. 6A-6B, the trace making up the first detection coil 51 extends from starting point 55 at the sensing surface 25 along a first path around a centre hole 56 of the PCB while defining four periods of a sinusoidal periodic waveform to a return position 57, at which the trace turns around and goes back along a second path while defining four periods of sinusoidal periodic waveform along the same area, but wherein the second path is offset 180 degrees with respect to the first path, thereby defining a first series of eight detection zones with alternating polarity. The four positive detection zones 57 created by the first detection coil 51 are marked with hatched plus symbol, and the four negative detection zones 58 created by the first detection coil 51 are marked with hatched minus symbol.

Similarly, the trace making up the second detection coil 52 extends from starting point at the sensing surface 25 along a third path around a centre hole 56 of the PCB while defining four periods of a sinusoidal periodic waveform to a return position, at which the trace turns around and goes back along a fourth path while defining four periods of sinusoidal periodic waveform along the same area, but wherein the fourth path is offset 180 degrees with respect to the third, thereby defining a second series of eight detection zones with alternating polarity. The four positive detection zones 59 created by the second detection coil 52 are marked with a solid plus symbol, and the four negative detection zones 64 created by the second detection coil 52 are marked with a solid minus symbol.

A phase of the second detection coil 52 is displaced approximately 90° with respect to a phase of the first detection coil 51. In other words, the traces making up the first and second detection coils 51, 52 are arranged mutually displaced along the circumference of the sensing surface 25, such that for a certain periodic excitation signal in the transmission coil 50 and any angular position of the park lock gear 20, a first periodic electrical signal will be induced in the first detection coil 51 and a second periodic electrical signal will be induced in the second detection coil 52, and the second periodic signal will be phase-shifted approximately 90° with respect to the first periodic signal.

By means of the first and second phase shifted detection coils 52, the actual angular position [θ] of the park lock gear may be determined using the equation:

$$\tan^{-1}\left(\frac{\sin \varphi}{\cos \varphi}\right).$$

As mentioned above, the transmission coil 50 is configured for being excited by a signal, in particular a sinusoidal signal, that is configured for, via inductive coupling, generating eddy-currents in the adjacent one or more teeth 41-44 of the park lock gear 20. Moreover, the signal of the transmission coil 50 is also configured for, via inductive coupling, generating eddy-currents in the engagement portion 39 of the locking pawl 21 when the locking pawl 21 is in the engaged state.

The signal supplied to the transmission coil 50 may for example have a sinusoidal shape with a frequency in the range of about 1-10 MHz.

The first and second detection coils 51, 52 are configured for detecting a target magnetic field generated by said eddy currents induced in the adjacent one or more teeth 41-44 of the park lock gear 20, and in the engagement portion 39 of the locking pawl 21 when the locking pawl 21 is in the engaged state.

In other words, the inductive angular position sensor 22 includes a transmission coil 50 configured for being supplied with a transmission signal operating at high frequency, and first and second detection coils 51, 52 sensing the magnetic fields generated by eddy currents of the metallic target, i.e. the teeth of the park lock gear 20 and the engagement portion 39 of the locking pawl 21 when the locking pawl 21 is in the engaged state.

Based on the signals induced in the first and second detection coils 51, 52 the angular position sensor 22 may accurately detects the angular position of a park lock gear 20. Angular position information may for example be delivered to the electronic control unit 19 and/or electric power converter 5 in the form of an analogue Sin/Cos signal, or 12-bit digital signal.

Figure 8:
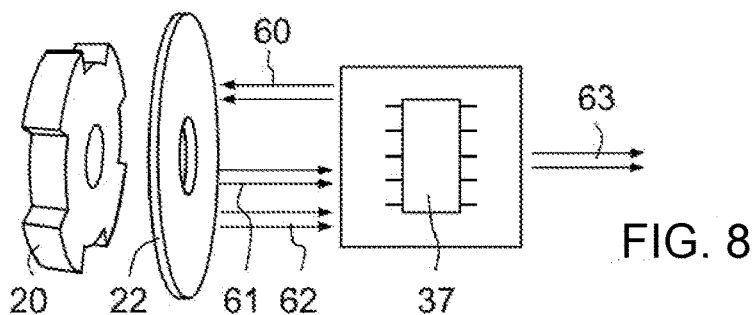
FIG. 8 shows schematically the signals generated and received by an integrated circuit associated with the inductive angular position sensor.

As schematically illustrated in FIG. 8, the inductive angular position sensor 22 may include an integrated circuit 37 that is configured for generating the required periodic transmission signal 60 operating at high frequency and supplying this signal 60 to the transmission coil 50 of the sensor. The first and second detection coils 51, 52 are connected to the integrated circuit 37, thereby enabling the integrated circuit 37 to detect the first periodic signal 61 induced in the first detection coil 51 and the second periodic signal 62 induced in the second detection coil 52. Based on this information, the integrated circuit 37 may supply analogue or digital output signal 63 representing the current angular position of the park lock gear 20.

Figure 7A:
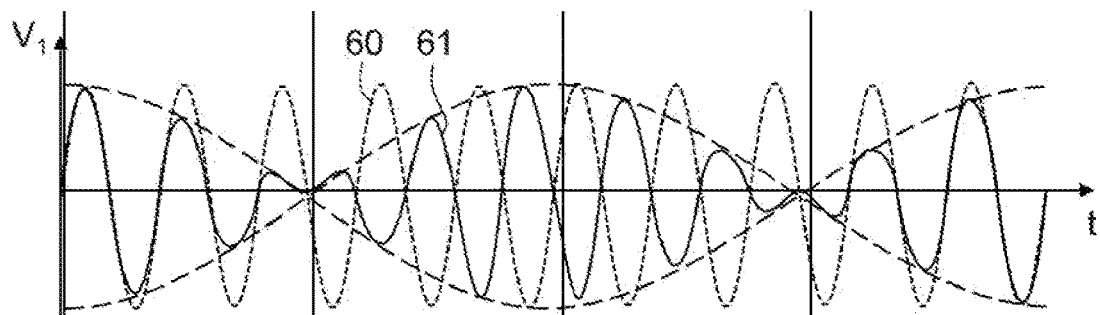
FIGS. 7A-7B show schematically example signal outputs from first and second detection coils.
Figure 7B:
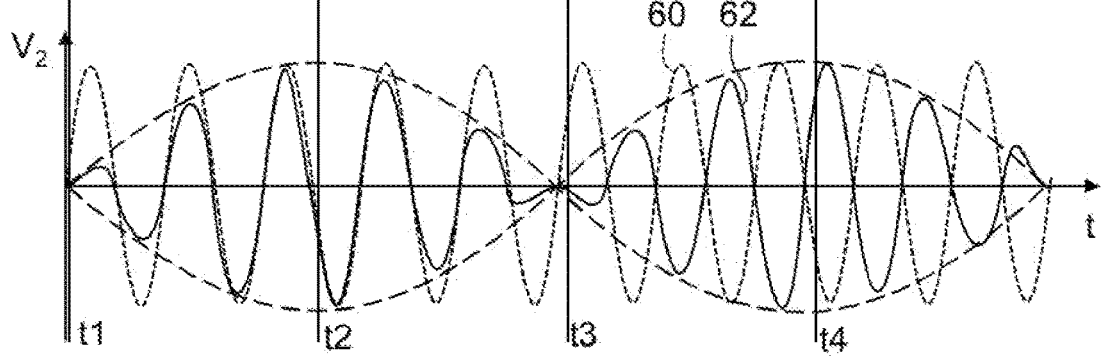

FIGS. 7A and 7B illustrates schematically example signal shapes of the periodic transmission signal 60 supplied to the transmission coil 50 and first and second periodic signals 61, 62 induced in the first and second detection coils 51, 52, respectively, of the park lock assembly of FIG. 6A-6B, during constant rotation of the park lock gear 20 with a certain rotational speed.

Specifically, FIG. 7A includes the transmission signal 60 having a constant amplitude and frequency, and the first detection signal 61 measured in the first detection coil 51, and FIG. 7B includes the transmission signal 60 having a constant amplitude and frequency, and the second detection signal 62 measured in the second detection coil 51.

During a first time period extending from t1 to t2, the transmission signal 60 and the first detection signal 61 are in phase and the first detection signal 61 has a decreasing amplitude, while the second detection signal 62 is also in phase with the transmission signal but with an increasing amplitude. This corresponds to motion sequence of the park lock gear 20 starting with the teeth 41-44 fully overlapping the hatched plus symbols 57, and rotating for example clockwise. When the teeth 41-44 fully overlaps the hatched plus symbols 57 at time t1, the eddy-currents induced in the teeth 41-44 by the transmission signal 60 generates a magnetic field that induces a current in the first detection coil, because the first detection coil forms local loops at the area of the hatched plus symbols 57. On the other hand, since the second detection coil 52 has crossing points at the region of the hatched plus symbols 57, no current is induced in the second detection coil 52 at time t1, as illustrated by the substantially zero voltage amplitude of the second detection signal 62.

Time point t2 corresponds to a situation when the park lock gear has rotated about 22.5 degrees clockwise from the region of the hatched plus symbols to the neighbouring regions 59 of solid plus symbol regions 59. When the teeth 41-44 fully overlaps the solid plus symbols 59 at time t2, the eddy-currents induced in the teeth 41-44 by the transmission signal 60 generates a magnetic field that induces a current in the second detection coil 52 having the same direction of the transmission signal 60, because the second detection coil 52 forms local loops at the area of the solid plus symbols 59. On the other hand, since the first detection coil 51 has crossing points at the region of the solid plus symbols 59, no current is induced in the first detection coil 51 at time t2, as illustrated by the substantially zero voltage amplitude of the first detection signal 61.

Time point t3 corresponds to a situation when the park lock gear has rotated another 22.5 degrees clockwise from the region of the solid plus symbols 59 to the neighbouring regions of hatches minus symbol regions 58. When the teeth 41-44 fully overlaps the hatched minus symbols 58 at time t3, the eddy-currents induced in the teeth 41-44 by the transmission signal 60 generates a magnetic field that induces a current in the first detection coil 51 having the opposite direction as the transmission signal 60, because the first detection coil 51 forms local loops at the area of the hatched minus symbols 58. Hence, at time point t3, the transmission signal 60 and first detection signal 61 are out of phase. Moreover, since the second detection coil 52 has crossing points at the region of the hatches minus symbols 58, no current is induced in the second detection coil 52 at time t3, as illustrated by the substantially zero voltage amplitude of the second detection signal 62.

Similarly, time point t4 corresponds to a situation when the park lock gear has rotated another 22.5 degrees clockwise from the region of the hatched minus symbols 58 to the neighbouring regions of solid minus symbols 64. When the teeth 41-44 fully overlaps the regions of solid minus symbols 64 at time t4, the eddy-currents induced in the teeth 41-44 by the transmission signal 60 generates a magnetic field that induces a current in the second detection coil 52 having the opposite direction as the transmission signal 60, because the second detection coil 52 forms local loops at the area of the solid minus symbols 64. Hence, at time point t4, the transmission signal 60 and second detection signal 62 are out of phase. On the other hand, since the first detection coil 51 has crossing points at the region of the solid minus symbols 64, no current is induced in the first detection coil 51 at time t4, as illustrated by the substantially zero voltage amplitude of the first detection signal 61.

Figure 9:
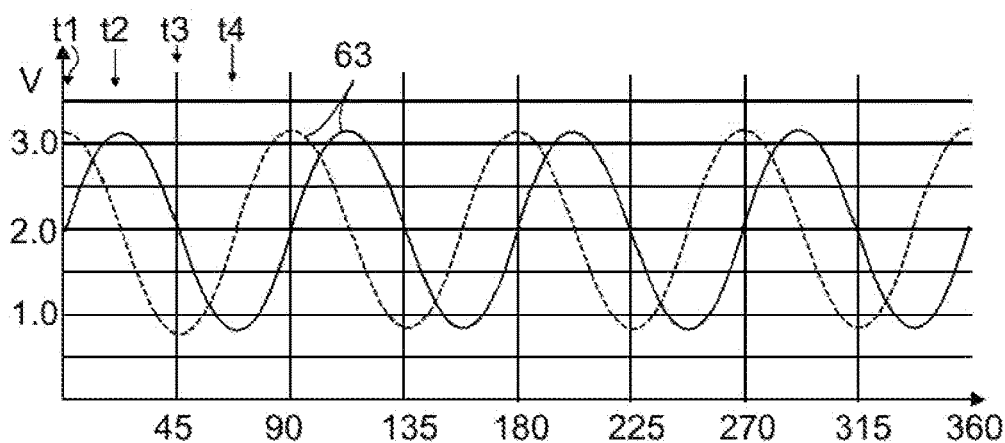
FIG. 9 shows schematically example signal outputs of the inductive angular position sensor.

Consequently, the sinusoidal shape of the first and second detection coils 51, 52 effectively results in amplitude modulation of the induced first and second detection signals 61, 62. Based on the transmission signal 60 and first and second detection signals 61, 62 detected in the first and second detections coils 51, 52, respectively, the integrated circuit 37 may supply for example two analogue output signals 63 as depicted in FIG. 9, which output signals 63 jointly represent the current angular position of the park lock gear.

Moreover, due to the sinusoidal shape of the first and second detection coils 51, 52 analogous to a twisted pair wire, a balanced dipole effect is accomplished that essentially cancels electric fields induced in the transmission coil from effecting the detecting changing magnetic fields in the first and second detection coils 51, 52. In other words, the first and second detection coils 51, 52 responds to changing magnetic field induced by eddy-currents in the teeth 41-44 of the park lock gear 20 only. The first and second detection coils 51, 52 reject external electromagnetic interference as well for the reason.

The use of PCB traces for creating the transmission coil 50 and first and second detection coils 51, 52 enables low manufacturing cost and small size and weight. Moreover, the PCB may be mounted in a rigid or semi-rigid housing provided with a sealing cover, such as a resin or the like, for providing high robustness.

Figure 10A:
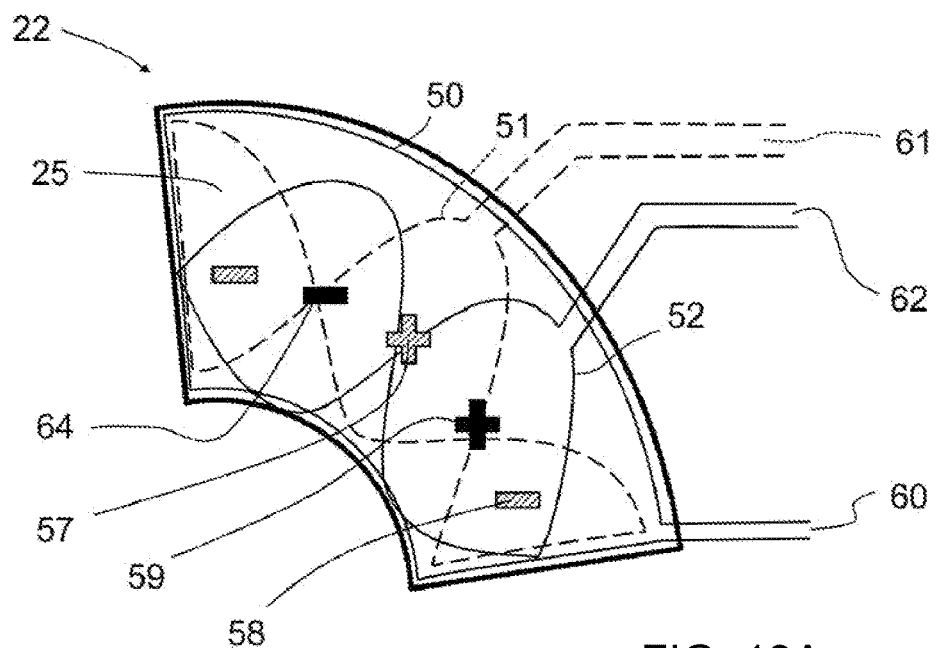
FIGS. 10A-10B show schematically a further example embodiment of the inductive angular position sensor according to the disclosure, without and with a park lock gear.
Figure 10B:
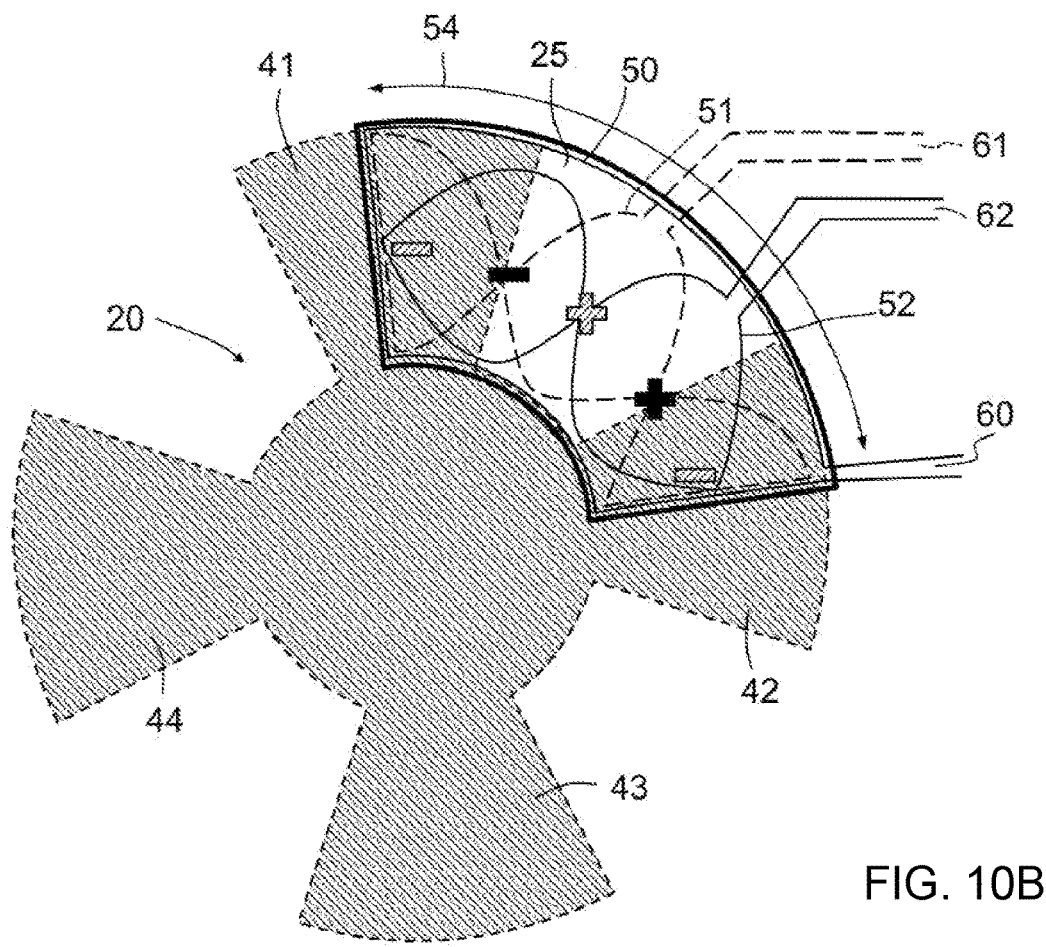

FIG. 10A and 10B shows merely an alternative example embodiment of the inductive angular position sensor 22, but with the same park lock gear 20 as described with reference to FIGS. 5A-9. In this example embodiment, the PCB of the inductive angular position sensor 22, as well as the transmission coil 50 and first and second detection coils 51, 52, merely extend along an arc-shaped region 54 covering some of the teeth 41-44 of the park lock gear 20, but not all, thereby enabling simplified assembly and replacement and reduced size. However, the transmission coil 50 and first and second detection coils 51, 52 do preferably not extend along an arc-shaped region 54 covering less than one complete tooth 41-44 and one complete neighbouring recess 45-48, for ensuring reliable and accurate angular position detection. In other words, for a park lock gear 20 having four teeth 41-44, said arc-shaped region 54 extends over not less than 90 degrees of the park lock gear 20. The functionality is the same as the described with reference to FIGS. 6A-6B and 7A-7B, but possibly with less sensitivity since eddy currents are only induced in one or maximal two half teeth at the same time, thereby resulting in lower amplitude of the detected first and second detection signals 61, 62.

As briefly mentioned above, the inductive angular position sensor 22 is also configured for detecting proper engagement of the locking pawl 21 with the park lock gear 20. This will be described more in detail below with reference to FIGS. 11A-11C, 12A-12C and 13A-13C.

Figure 11A:
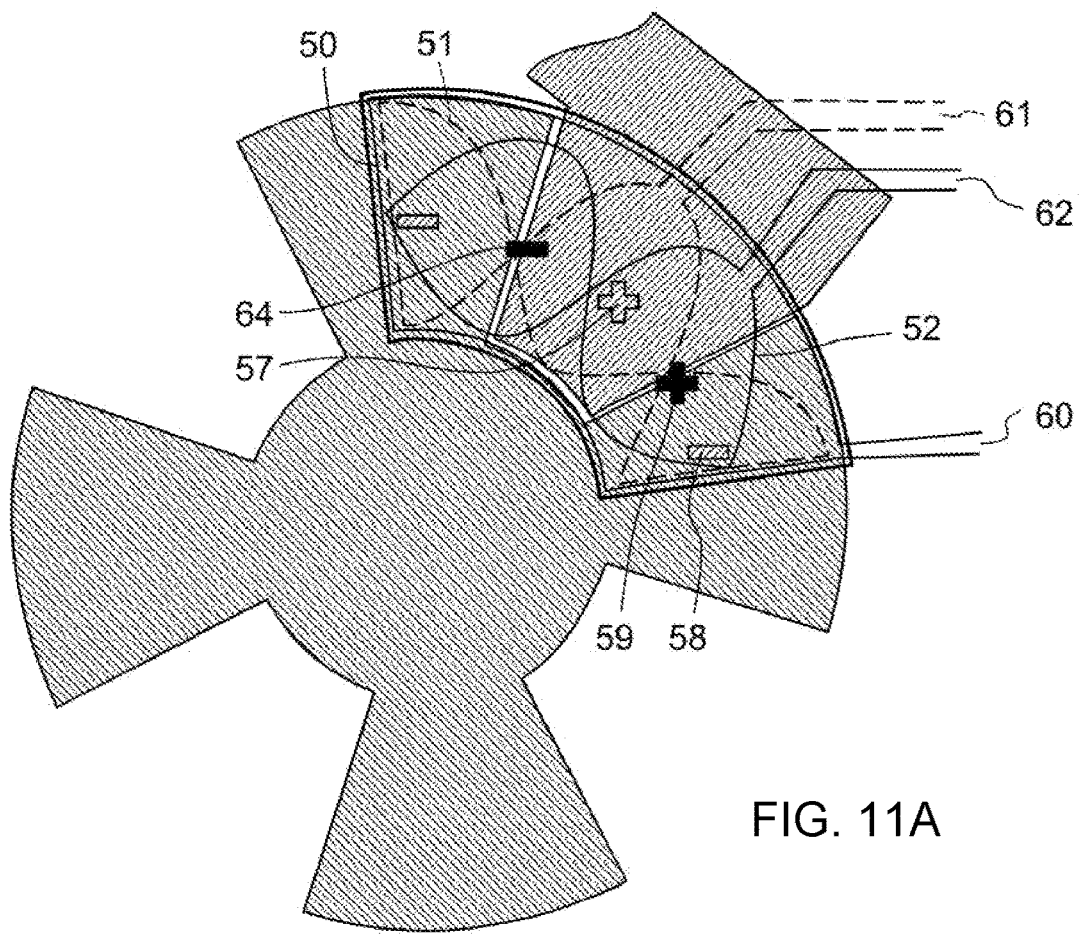
FIGS. 11A-11C show schematically proper engagement state of the locking pawl with the park lock gear and shapes of associated first and second detection signals according to an example embodiment of the park lock assembly.
Figure 11B:
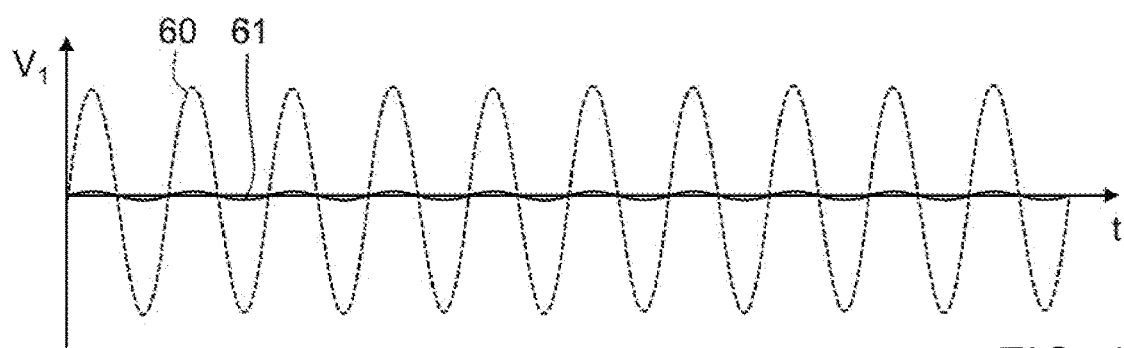
Figure 11C:
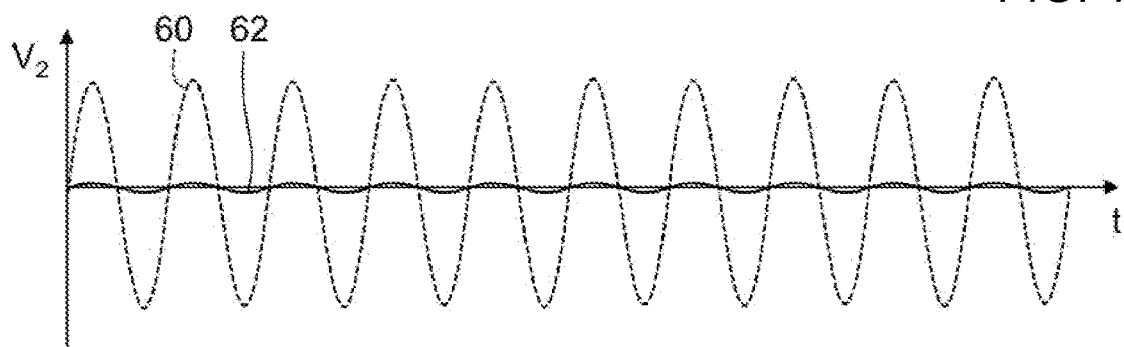

Specifically, FIG. 11A shows proper engagement state of the locking pawl 21 with the park lock gear 20, wherein FIGS. 11B and 11C schematically shows the first and second detection signals 61, 62 induced in the first and second detection coils 51, 52 over time, respectively, in said engaged state.

Figure 12A:
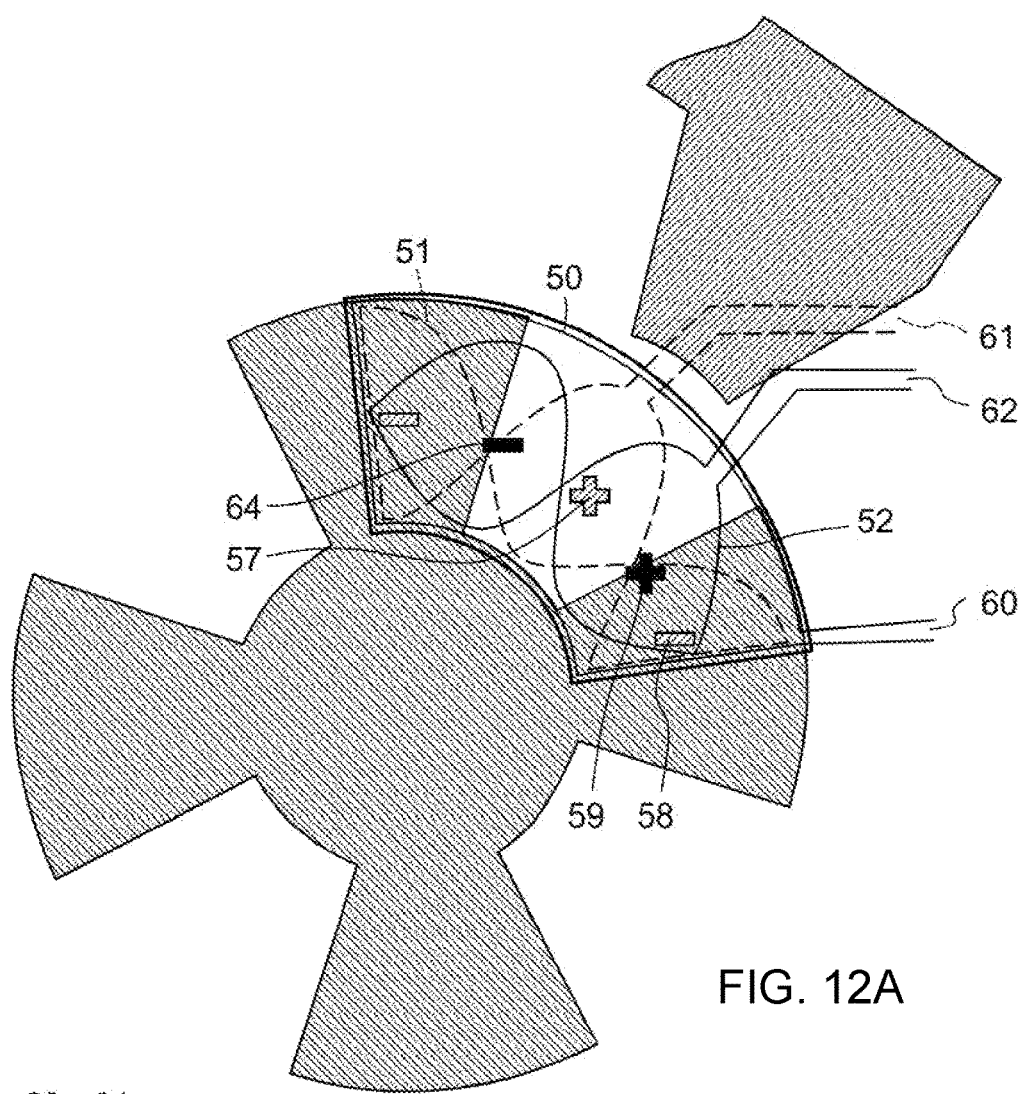
FIGS. 12A-12C show schematically non-engagement state of the locking pawl with the park lock gear and shapes of associated first and second detection signals according to an example embodiment of the park lock assembly.
Figure 12B:
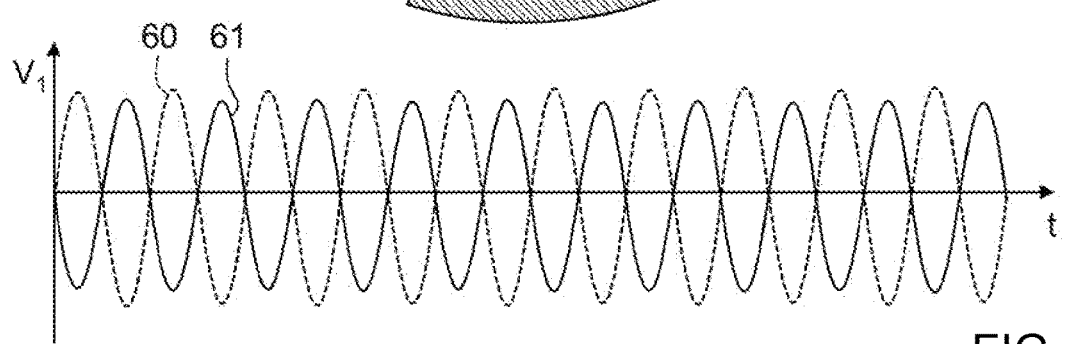
Figure 12C:
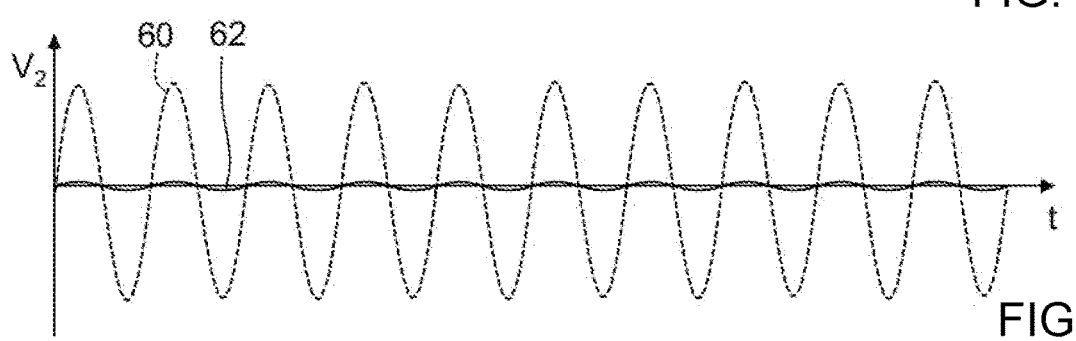

FIG. 12A shows a non-engagement state of the locking pawl 21 with the park lock gear 20 caused by for example malfunctioning locking pawl actuator 30 or associated command failure, such that the locking pawl does not move towards the park lock gear 20 as desired, wherein FIGS. 12B and 12C schematically shows the first and second detection signals 61, 62 induced in the first and second detection coils 51, 52 over time, respectively, in said non-engaged state.

Figure 13A:
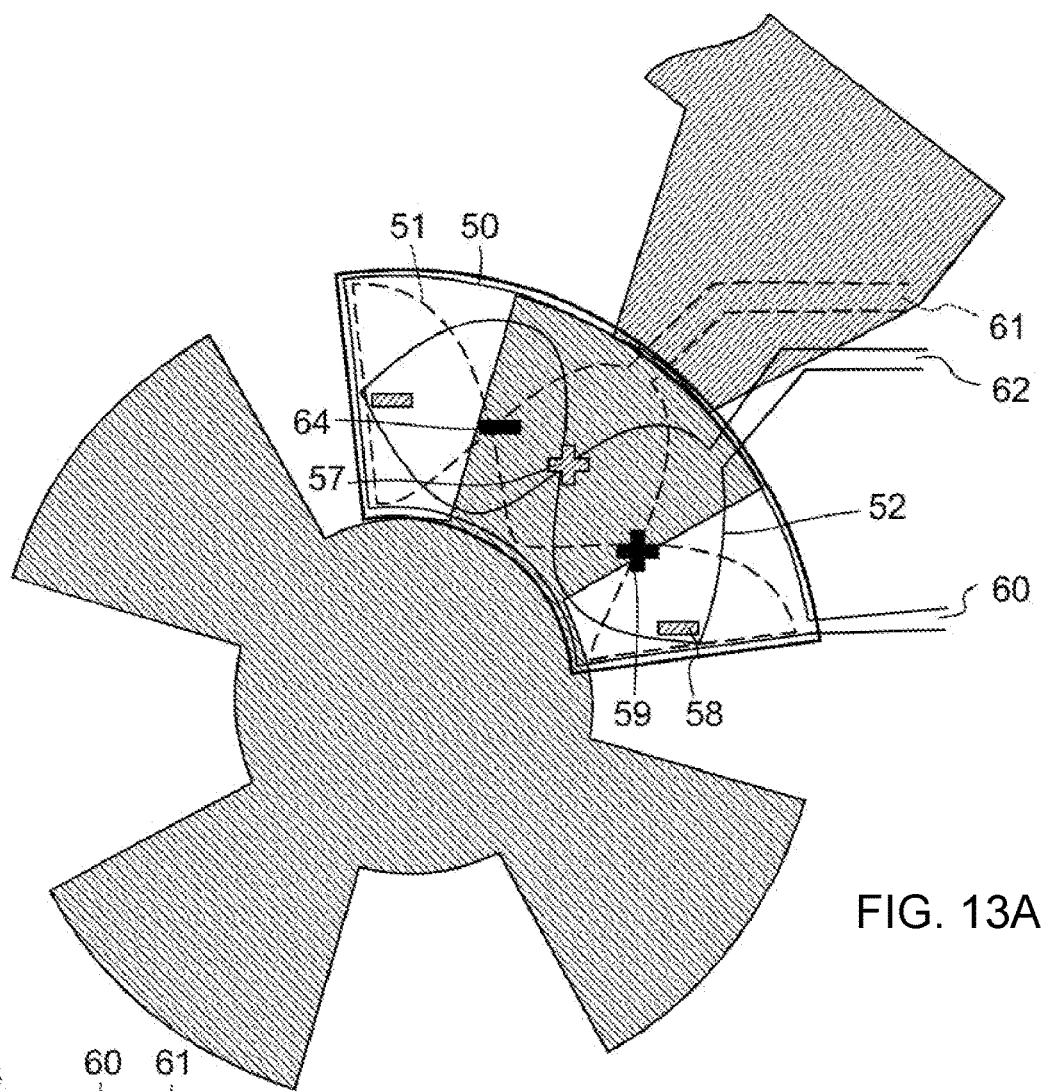
FIGS. 13A-13C show schematically another non-engagement state of the locking pawl with the park lock gear and shapes of associated first and second detection signals according to an example embodiment of the park lock assembly.
Figure 13B:
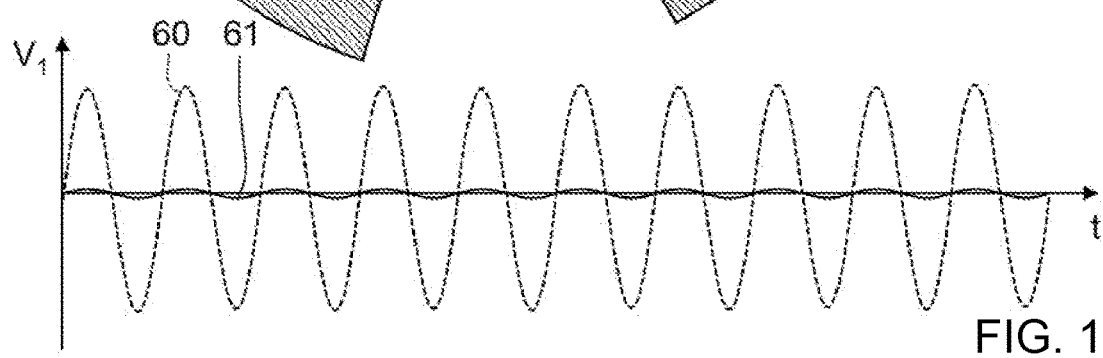
Figure 13C:
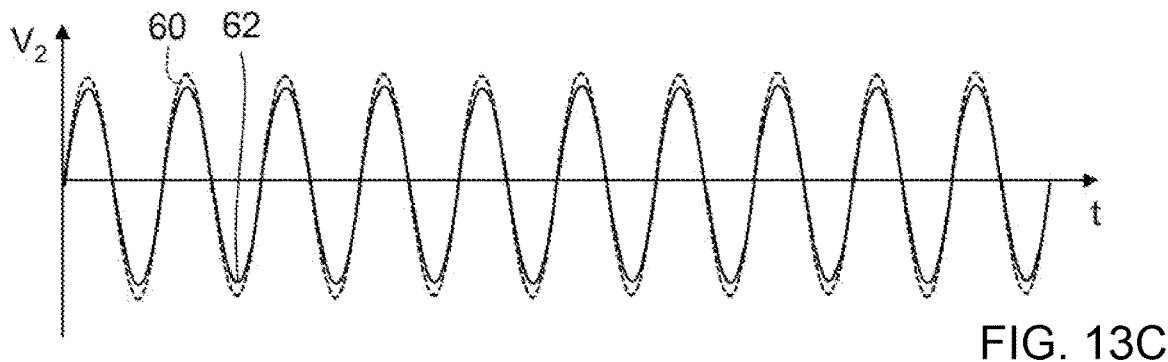

Furthermore, FIG. 13A shows a non-proper engagement state of the locking pawl 21, i.e. a state in which locking pawl 21 abuts a tooth 41-44 of the park lock gear 20 when the locking pawl actuator 30 urges the locking pawl 21 to shift from the disengaged state to the engaged state, thereby preventing the locking pawl 21 from entering a recess 45-48 of the park lock gear 20, and FIGS. 13B and 13C schematically shows the first and second detection signals 61, 62 induced in the first and second detection coils 51, 52, respectively, in said non-engaged state.

As may be derived from for example the first and second detection signals 61, 62 in the various example engagement and non-engagement states of the locking pawl 21 schematically shown in FIGS. 11B-11C, 12B-12C and 13B-13C, the inductive angular position sensor 22 may be configured to provide an output signal with the moveable locking pawl in the engaged state and the park lock gear in the stationary state, that differs from the output signal of the inductive angular position sensor with the moveable locking pawl in the disengaged or non-engaged state and the park lock gear in the stationary state, and wherein this difference in output signal may be used for detecting said proper engagement of locking pawl with the park lock gear.

One approach for distinguishing a proper engagement of the locking pawl 21 with the park lock gear 20, as illustrated in FIGS. 11A, with some types of disengaged or non-engaged states of the locking pawl with the park lock gear 20, may be to compare the amplitude of the first and second detection signals 61, 62 with the amplitude of the transmission signal 60. As derivable from FIGS. 11B-11C, 12B-12C and 13B-13C, the amplitude of both the first and second detection signals 61, 62 are relatively low compared with the amplitude of the transmission signal 60 when the locking pawl 21 is in proper engagement with the park lock gear 20, while the amplitude of at least one of the first and second detection signals 61, 62 may be deemed significantly larger when the locking pawl 21 is in non-proper engagement with the park lock gear 20.

Consequently, the teeth 41-44 of the park lock gear 20, the engagement portion 39 of the locking pawl 21 and the first and second detection coils 51, 52 are configured such that said target magnetic field induces a first detection signal 61, in particular a sinusoidal signal, in the first detection coil 51, and a second detection signal 62, in particular a sinusoidal signal, in the second detection coil 52, and wherein an amplitude of at least one of said first and second detection signal 61, 62 decreases when the moveable locking pawl 21 moves from disengaged state to the engaged state while the park lock gear 20 is in the stationary state.

In other words, a corresponding method for detecting engagement of the locking pawl 21 with park lock gear 20 of a park lock assembly of a vehicle transmission may include a first step of providing a park lock assembly including a toothed park lock gear 20, a moveable locking pawl 21 that is moveable between an engaged state, in which the locking pawl 21 is in locking engagement with the park lock gear 20, and a disengaged state, in which the park lock gear 20 is freely rotatable relative to the locking pawl 21, and an inductive angular position sensor 22 located on an axial side of the park lock gear 20 and configured for detecting angular position of the park lock gear 20, wherein the inductive angular position sensor 22 comprises a transmission coil 50, a first detection coil 51 and a second detection coil 52, wherein the transmission coil 50 is configured for being excited by a periodic transmission signal 60.

The method for detecting engagement of the locking pawl 21 with park lock gear 20 may further include a second step of, upon receiving a vehicle parking command, registering a first value reflecting an amplitude of a first detection signal 61 of the first detection coil 51 and a first value reflecting an amplitude of a second detection signal 62 of the second detection coil 52.

The method for detecting engagement of the locking pawl 21 with park lock gear 20 may further include a third step of actuating a locking pawl actuator 30 for shifting a locking pawl 21 from the disengaged state to the engaged state.

The method for detecting engagement of the locking pawl 21 with park lock gear 20 may further include a fourth step of registering a second value reflecting an amplitude of the first detection signal 61 of the first detection coil 51 and a second value reflecting an amplitude of the second detection signal 62 of the second detection coil 52.

Finally, the method for detecting engagement of the locking pawl 21 with park lock gear 20 may further include a fifth step of verifying engagement of the locking pawl 21 with park lock gear 20 of a vehicle transmission when the amplitude of at least one of the first and second detection signals 61, 62, in connection with actuation of the locking pawl actuator 30, becomes reduced below a predetermined degree, in particular below a predetermined percentage level.

The fifth step of verifying said engagement of the locking pawl 21 with park lock gear 20 may involve comparison of the first and second registered values reflecting the amplitude of the first detection signal 61, and comparison of the first and second values reflecting the amplitude of the second detection signal 62, for determining the difference in amplitude level of the first and second detection signals 61, 62 before and after actuation of the locking pawl actuator 30.

The illustrated schematic example shapes of the first and second detection signals 61, 62 may of course vary a lot depending on design of the park lock gear 20, the teeth 41-44, the locking pawl 21, and the design and configuration of the inductive angular position sensor 22, Hence, the design, configuration and signal shapes schematically shown in FIGS. 11A-13C are merely one example out of many possible variations within the scope of the present disclosure.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof.

For example, although the transmission housing 6 and electrical propulsion machine 2 mostly have been schematically illustrated as being individual part, the park lock gear, transmission and drivetrain according to the present disclosure may alternatively have a more compact design and structure with some or all of these parts being mounted within a single unit.

Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

What is claimed is:

1. A park lock assembly for a vehicle transmission, the park lock assembly comprising:
    a toothed park lock gear,
    a moveable locking pawl that is moveable between an engaged state, in which the locking pawl is in locking engagement with the park lock gear, and a disengaged state, in which the park lock gear is freely rotatable relative to the locking pawl, and
    an inductive angular position sensor located on an axial side of the park lock gear and configured for detecting angular position of the park lock gear,
    wherein the inductive angular position sensor comprises a transmission coil, a first detection coil and a second detection coil, wherein each of said transmission coil, first detection coil and second detection coil are arranged in a radial region corresponding to teeth of the park lock gear, and wherein each of said transmission coil, first detection coil, and second detection coil extend along an arc-shaped region covering at least one tooth of the park lock gear and a position of an engagement portion of the moveable locking pawl in its engaged state, and
    wherein the teeth of the park lock gear, the engagement portion of the locking pawl, the first detection coil, and second detection coil are configured such that a target magnetic field induces a first detection signal in the first detection coil and a second detection signal in the second detection coil, and wherein an amplitude of at least one of the first and second detection signals decreases when the moveable locking pawl moves from disengaged state to the engaged state while the park lock gear is in the stationary state.

2. The park lock assembly according to claim 1, wherein the inductive angular position sensor comprises a printed circuit board, wherein each of said transmission coil, first detection coil and second detection coil is manufactured as one or a set of traces on the printed circuit board, wherein the trace or traces of each of the first and second detection coils has a periodic waveform shape for defining a series of detection zones with alternating polarity, wherein a phase of the second detection coil is displaced approximately 90° with respect to a phase of the first detection coil, and wherein each of said transmission coil and first and second detection coils are arranged in parallel with a plane of the park lock gear.

3. The park lock assembly according to claim 1, wherein the inductive angular position sensor comprises a transmission coil that is configured for being excited by a transmission signal having a specific frequency, which transmission signal is configured for, via inductive coupling, generating eddy-currents in one or more teeth of the park lock gear.

4. The park lock assembly according to claim 1, wherein the transmission coil is configured for being excited by a transmission signal having a specific frequency, which transmission signal is configured for, via inductive coupling, generating eddy-currents in the adjacent one or more teeth of the park lock gear, and in the engagement portion of the locking pawl when the locking pawl is in the engaged state.

5. The park lock assembly according to claim 1, wherein the inductive angular position sensor comprises a first detection coil and the second detection coil that are configured for detecting the target magnetic field generated by eddy currents induced in the one or more teeth of the park lock gear.

6. The park lock assembly according to claim 1, wherein the first and second detection coils are configured for detecting the target magnetic field generated by eddy currents induced in the adjacent one or more teeth of the park lock gear, and in an engagement portion of the locking pawl when the locking pawl is in the engaged state.

7. The park lock assembly according to claim 1, wherein the inductive angular position sensor is configured for detecting angular position of the park lock gear by interaction with the teeth of the park lock gear.

8. The park lock assembly according to claim 1, wherein the inductive angular position sensor is configured for generating eddy-currents in one or more teeth of the park lock gear, detecting the magnetic fields generated by said eddy currents, and subsequently determining angular position of the park lock gear based on the detected magnetic fields.

9. A vehicle transmission comprising a first shaft having a first gear in meshing contact with and a second gear that is mounted on a second shaft, wherein the transmission further comprises a park lock assembly according to claim 1, and wherein the toothed park lock gear is mounted and rotationally secured to the first or second shaft.

10. A vehicle drivetrain comprising an electrical propulsion machine, an electronic control unit and a park lock assembly according to claim 1, wherein the electrical propulsion machine is drivingly connected or connectable to a driving wheel via at least a first shaft, wherein the toothed park lock gear is mounted and rotationally secured to the first shaft or another shaft that is driving connectable with the first shaft, and wherein the electronic control unit is configured for, upon receiving a vehicle parking command, first operating the electrical propulsion machine, based on input from the inductive angular position sensor, for setting the toothed park lock gear in an angular position matching the position of the locking pawl, and subsequently actuating a locking pawl actuator for shifting the locking pawl from the disengaged state to the engaged state.

11. The vehicle drivetrain according to claim 10, wherein the electronic control unit further is configured for, after actuation of the locking pawl actuator for shifting the locking pawl from the disengaged state to the engaged state, verifying proper engagement of the locking pawl with the park lock gear based on input from the inductive angular position sensor.

12. A vehicle comprising the vehicle drivetrain according to claim 11.

13. The park lock assembly according to claim 1, wherein the inductive angular position sensor is further configured to detect proper engagement of the locking pawl with the park lock gear.

14. The park lock assembly according to claim 13, wherein the locking pawl is in proper engagement with the park lock gear when the engagement portion of the locking pawl is seated in a recess defined by two neighbouring teeth of the park lock gear.

15. The park lock assembly according to claim 13, wherein the locking pawl is in proper engagement with the park lock gear when the engagement portion of the locking pawl completely fills a recess defined by two neighbouring teeth of the park lock gear.

16. The pack lock assembly according to claim 1, wherein an output signal of the inductive angular position sensor, with the moveable locking pawl in the engaged state and the park lock gear in the stationary state, differs from the output signal of the inductive angular position sensor, with the moveable locking pawl in the disengaged state and the park lock gear in the stationary state, and wherein this difference in output signal is configured to be used for detecting proper engagement of locking pawl with the park lock gear.

17. A method for setting a vehicle transmission in a parked state, comprising:

upon receiving a vehicle parking command, operating an electrical propulsion machine drivingly connected with a toothed park lock gear, based on input from an inductive angular position sensor located on an axial side of the park lock gear and configured for detecting angular position of the park lock gear, for setting the toothed park lock gear in an angular position matching the position of a locking pawl associated with the park lock gear, and actuating a locking pawl actuator for shifting the locking pawl from a disengaged state, in which the park lock gear is freely rotatable relative to the locking pawl, to an engaged state, in which the locking pawl is in locking engagement with the park lock gear, wherein the inductive angular position sensor comprises a transmission coil, a first detection coil, and a second detection coil, wherein each of the transmission coil, first detection coil, and second detection coil extend along an arc-shaped region covering at least one tooth of the park lock gear and a position of an engagement portion of the locking pawl in its engaged state, and wherein the teeth of the park lock gear, an engagement portion of the locking pawl, the first detection coil, and the second detection coil are configured such that a target magnetic field induces a first detection signal in the first detection coil and a second detection signal in the second detection coil, and wherein an amplitude of at least one of the first and second detection signals decreases when the locking pawl moves from the disengaged state to the engaged state while the park lock gear is in a stationary state.

\* \* \* \* \*